(12) United States Patent
Fukuda et al.

(10) Patent No.: US 12,190,534 B2
(45) Date of Patent: Jan. 7, 2025

(54) OBJECT AMOUNT CALCULATION APPARATUS AND OBJECT AMOUNT CALCULATION METHOD

(71) Applicant: Panasonic Intellectual Property Management Co., Ltd., Osaka (JP)

(72) Inventors: Masaki Fukuda, Osaka (JP); Toshiyasu Sugio, Osaka (JP); Toru Matsunobu, Osaka (JP); Satoshi Yoshikawa, Hyogo (JP); Kensho Teranishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 431 days.

(21) Appl. No.: 17/459,219

(22) Filed: Aug. 27, 2021

(65) Prior Publication Data
US 2021/0390717 A1   Dec. 16, 2021

Related U.S. Application Data

(63) Continuation of application No. PCT/JP2020/006390, filed on Feb. 19, 2020.
(Continued)

(51) Int. Cl.
 *G06T 7/33* (2017.01)
 *G06T 17/00* (2006.01)
 *G06T 19/20* (2011.01)

(52) U.S. Cl.
 CPC ............. *G06T 7/344* (2017.01); *G06T 17/00* (2013.01); *G06T 19/20* (2013.01); *G06T 2207/20224* (2013.01); *G06T 2219/2004* (2013.01)

(58) Field of Classification Search
 CPC .. G06T 7/344; G06T 7/33; G06T 7/337; G06T 7/246; G06T 7/248; G06T 7/251;
(Continued)

(56) References Cited

U.S. PATENT DOCUMENTS

2010/0111364 A1   5/2010  Iida et al.
2011/0206274 A1*  8/2011  Tateno .................. G06T 7/75
                                                     382/154
(Continued)

FOREIGN PATENT DOCUMENTS

JP        2002-328021       11/2002
JP         2003-77011        3/2003
(Continued)

OTHER PUBLICATIONS

Rathje, Ellen M., and Kevin Franke. "Remote sensing for geotechnical earthquake reconnaissance." Soil Dynamics and Earthquake Engineering 91 (2016): 304-316. (Year: 2016).*
(Continued)

*Primary Examiner* — Edward F Urban
*Assistant Examiner* — Duy Tran
(74) *Attorney, Agent, or Firm* — Wenderoth, Lind & Ponack, L.L.P.

(57) ABSTRACT

An object amount calculation apparatus includes: a receiver configured to obtain a first three-dimensional model and a second three-dimensional model different from the first three-dimensional model, each of the first three-dimensional model and the second three-dimensional model representing a same space, each of the first three-dimensional model and the second three-dimensional model being constituted with regions having respective attributes; and a processor configured to: align the first three-dimensional model and the second three-dimensional model based on at least one attribute of the first three-dimensional model and the second
(Continued)

three-dimensional model; calculate, for each of the attributes, a difference between the first three-dimensional model aligned and the second three-dimensional model aligned; and output (i) a total amount of differences corresponding to two or more attributes among the attributes and (ii) information on the two or more attributes.

14 Claims, 13 Drawing Sheets

Related U.S. Application Data

(60) Provisional application No. 62/813,351, filed on Mar. 4, 2019.

(58) Field of Classification Search
CPC ......... G06T 17/00; G06T 17/05; G06T 19/00; G06T 19/003; G06T 19/20; G06T 2207/20224; G06T 2207/20228; G06T 2207/20021; G06T 2219/2004; G06T 2200/08; G06T 3/00; G06T 3/0031
See application file for complete search history.

(56) References Cited

U.S. PATENT DOCUMENTS

| | | | |
|---|---|---|---|
| 2014/0037194 A1* | 2/2014 | Kitamura | G06T 7/344 382/154 |
| 2017/0094244 A1* | 3/2017 | Karasudani | G06T 19/006 |
| 2017/0270386 A1* | 9/2017 | Trouve | G06V 20/653 |
| 2018/0211133 A1* | 7/2018 | Trouve | G06F 18/2413 |
| 2020/0326187 A1 | 10/2020 | Ohhashi | |

FOREIGN PATENT DOCUMENTS

| | | |
|---|---|---|
| JP | 2004-54308 | 2/2004 |
| JP | 2005-114744 | 4/2005 |
| JP | 2010-112729 | 5/2010 |
| JP | 2014-100099 | 6/2014 |
| JP | 2016-103263 | 6/2016 |
| WO | 2018/020691 | 2/2018 |

OTHER PUBLICATIONS

International Search Report (ISR) issued on Mar. 31, 2020 in International (PCT) Application No. PCT/JP2020/006390.
Extended European Search Report issued Apr. 4, 2022 in corresponding European Patent Application No. 20765468.2.
Rathje et al., "Remote sensing for geotechnical earthquake reconnaissance", Soil Dynamics and Earthquake Engineering, vol. 91, Sep. 2016, pp. 304-316.
Tsai et al., "Post-disaster assessment of landslides in southern Taiwan after 2009 Typhoon Morakot using remote sensing and spatial analysis", Natural Hazards Earth System Sciences, vol. 10, No. 10, Jan. 2010, pp. 2179-2190.
Wang et al., "Three-dimensional information extraction from GaoFen-1 satellite images for landslide monitoring", Geomorphology, vol. 309, May 2018, pp. 77-85.
Search Report dated Jul. 17, 2024 in counterpart Chinese patent application No. 202080018282.1, with English translation, 3 pages.

* cited by examiner

FIG. 2
(a) Image data
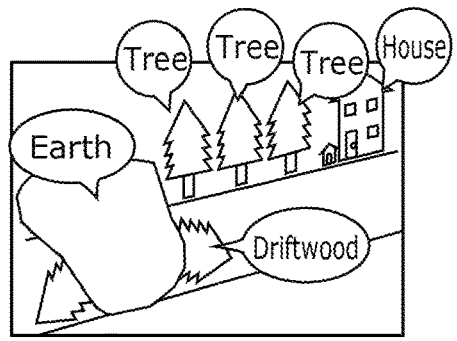
(b) Three-dimensional model
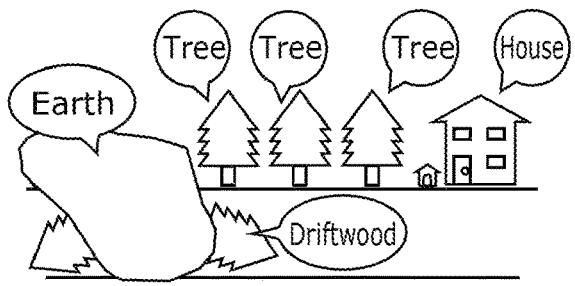
(c) Image data
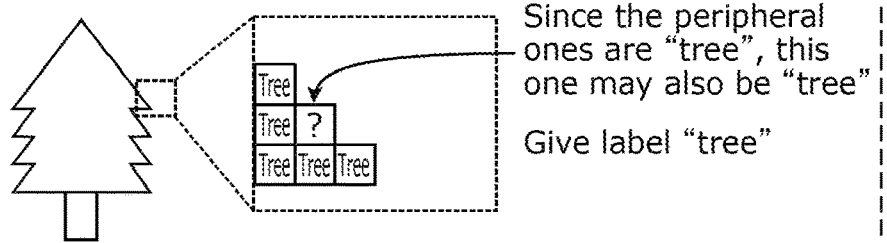

OBJECT AMOUNT CALCULATION APPARATUS AND OBJECT AMOUNT CALCULATION METHOD

CROSS REFERENCE TO RELATED APPLICATIONS

This is a continuation application of PCT International Application No. PCT/JP2020/006390 filed on Feb. 19, 2020, designating the United States of America, which is based on and claims priority of U.S. Provisional Patent Application No. 62/813,351 filed on Mar. 4, 2019. The entire disclosures of the above-identified applications, including the specifications, drawings and claims are incorporated herein by reference in their entirety.

FIELD

The present disclosure relates to an object amount calculation apparatus and an object amount calculation method.

BACKGROUND

There is a technique of measuring an amount of an object in a predetermined space, such as the volume or weight (see Patent Literature (PTL) 1, for example).

With the technique disclosed in PTL 1, an image of a scene of a landslide is compared with an image of the same site before occurrence of the landslide, and these images are aligned to be used for generating a three-dimensional model, and the amount of disaster at the scene of the landslide is calculated based on the three-dimensional model generated.

CITATION LIST

Patent Literature

PTL 1: Japanese Unexamined Patent Application Publication No. 2002-328021

SUMMARY

An object amount calculation apparatus according to an aspect of the present disclosure includes: a receiver configured to obtain a first three-dimensional model and a second three-dimensional model different from the first three-dimensional model, each of the first three-dimensional model and the second three-dimensional model representing a same space, each of the first three-dimensional model and the second three-dimensional model being constituted with regions having respective attributes; and a processor configured to: align the first three-dimensional model and the second three-dimensional model based on at least one attribute of the first three-dimensional model and the second three-dimensional model; calculate, for each of the attributes, a difference between the first three-dimensional model aligned and the second three-dimensional model aligned; and output (i) a total amount of differences corresponding to two or more attributes among the attributes and (ii) information on the two or more attributes.

An object amount calculation method according to an aspect of the present disclosure includes: obtaining a first three-dimensional model and a second three-dimensional model different from the first three-dimensional model, each of the first three-dimensional model and the second three-dimensional model representing a same space, each of the first three-dimensional model and the second three-dimensional model being constituted with regions having respective attributes; aligning the first three-dimensional model and the second three-dimensional model based on at least one attribute of the first three-dimensional model and the second three-dimensional model; calculating, for each of the attributes, a difference between the first three-dimensional model and the second three-dimensional model which are aligned in the aligning; and outputting (i) a total amount of differences corresponding to two or more attributes among the attributes and (ii) information on the two or more attributes.

Note that the present disclosure may be implemented as a program that causes a computer to perform steps included in the above object amount calculation method. The present disclosure may also be implemented as a computer-readable, non-transitory recording medium, such as a CD-ROM, on which the program is recoded. The present disclosure may also be implemented as information, data, or a signal indicating the program. The program, information, data, and signal may be distributed via a communication network such as the Internet.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2 is a diagram for describing an overview of attribute extraction processing performed by the earth amount measurement system according to the embodiment.

Figure 1:
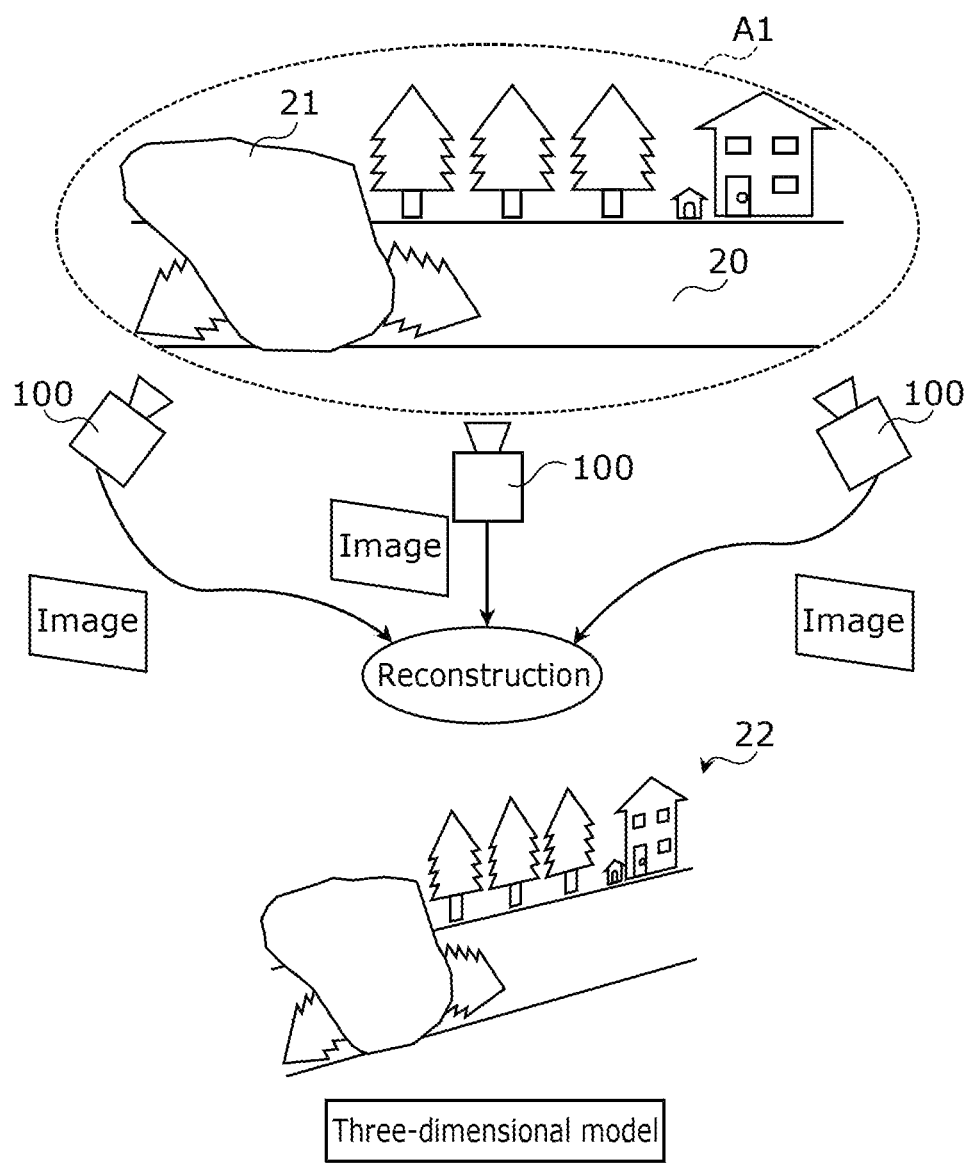
FIG. 1 is a diagram for describing an overview of an earth amount measurement system according to an embodiment.

DESCRIPTION OF EMBODIMENTS (Overview of the Present Disclosure)

An object amount calculation apparatus according to an aspect of the present disclosure includes: an obtaining circuit that obtains a first three-dimensional model and a second three-dimensional model different from the first three-dimensional model, each of the first three-dimensional model and the second three-dimensional model representing a same space which is a predetermined space, each of the first three-dimensional model and the second three-dimensional model being constituted with regions having respective attributes; an alignment circuit that aligns the first three-dimensional model and the second three-dimensional model based on an attribute of the first three-dimensional model and the second three-dimensional model; and a calculation circuit that calculates an amount of a difference between the first three-dimensional model and the second three-dimensional model which are aligned by the alignment circuit, and outputs an attribute of the difference and the amount of the difference.

There is a conventional method of, for example, measuring (calculating) an amount of earth that has flowed into a predetermined space as a result of a landslide or the like at a scene of a landslide disaster, for instance. Laser measurement can calculate the amount of earth at high accuracy, but the calculation by the laser measurement is time-consuming and costly. In view of this, an object amount calculation apparatus according to the present disclosure, for example, compares a three-dimensional model representing a predetermined space in which an object, such as earth, whose amount is to be calculated is absent (a first three-dimensional model) and a three-dimensional model representing the predetermined space in which the object is present (a second three-dimensional model). With this, the difference between the first three-dimensional model and the second three-dimensional model can be simply and easily calculated by appropriately aligning the first three-dimensional model and the second three-dimensional model. Accordingly, the object amount calculation method according to the present disclosure can reduce the processing time for calculating the amount of the object.

For example, the object amount calculation apparatus according to an aspect of the present disclosure further includes: a generation circuit that generates at least one of the first three-dimensional model or the second three-dimensional model from a plurality of images each representing the predetermined space.

This makes it possible to calculate the amount of the difference using a simple configuration for generating an image, such as a camera.

For example, when the difference has a plurality of attributes different from one another, the calculation circuit classifies the plurality of attributes according to type, and outputs classified attributes to cause a display apparatus to collectively display the plurality of attributes on a type-by-type basis.

With this, the types of objects included in the difference are classified and displayed by the display apparatus, and thus the user who checks the display apparatus can easily understand the types of the objects included in the difference.

For example, the calculation circuit calculates an amount included in the amount of the difference on the type-by-type basis.

With this, the amounts of objects included in the difference are displayed by the display apparatus on a type-by-type basis, and thus the user who checks the display apparatus can easily understand the amounts included in the amount of the difference on a type-by-type basis.

For example, the amount of the difference is at least one of a volume or a weight of the difference.

With this, the object amount calculation apparatus according to the present disclosure can calculate at least one of the amount or the volume of the difference.

For example, the alignment circuit extracts a partial model from the first three-dimensional model and a partial model from the second three-dimensional model which have a common attribute, aligns the partial models by shifting the partial models to align coordinates of corresponding positions in the partial models, and subsequently aligns the first three-dimensional model and the second three-dimensional model by shifting the first three-dimensional model and the second three-dimensional model in accordance with a shift of the partial models.

With this, the object amount calculation apparatus according to the present disclosure can align the first three-dimensional model and the second three-dimensional model without time-consuming processing such as alignment of the three-dimensional models through comparison of the shapes thereof. This makes it possible to further reduce the processing time of the object amount calculation apparatus according to the present disclosure.

An object amount calculation method according to an aspect of the present disclosure includes: obtaining a first three-dimensional model and a second three-dimensional model different from the first three-dimensional model, each of the first three-dimensional model and the second three-dimensional model representing a same space which is a predetermined space, each of the first three-dimensional model and the second three-dimensional model being constituted with regions having respective attributes; aligning the first three-dimensional model and the second three-dimensional model based on an attribute of the first three-dimensional model and the second three-dimensional model; and calculating an amount of a difference between the first three-dimensional model and the second three-dimensional model which are aligned in the aligning, and outputting an attribute of the difference and the amount of the difference.

With this, the difference between the first three-dimensional model and the second three-dimensional model can be simply and easily calculated by appropriately aligning the first three-dimensional model and the second three-dimensional model. Accordingly, the object amount calculation method according to the present disclosure can reduce the processing time for calculating an amount of an object.

For example, in the obtaining, the first three-dimensional model representing the predetermined space before inflow of earth and the second three-dimensional model representing the predetermined space after the inflow of the earth are obtained, and in the calculating, an amount of the earth is calculated as the amount of the difference. With this, the amount of earth, i.e., the difference, can be simply and easily calculated by appropriately aligning the three-dimensional models representing the predetermined space before and after a disaster that has caused earth to flow into the predetermined space. Accordingly, the object amount calculation method according to the present disclosure can reduce the processing time for calculating the amount of the earth.

Hereinafter, each embodiment of the present disclosure is described in detail with reference to the drawings. Note that each embodiment described below illustrates a specific example of the present disclosure. Therefore, numerical values, shapes, materials, elements, the arrangement and connection of the elements, steps, the processing order of the steps, etc. described in each embodiment below are mere examples, and are not intended to limit the present disclosure.

Note also that the drawings are represented schematically and are not necessarily precise illustrations. In the drawings, essentially the same elements are given the same reference signs, and overlapping descriptions thereof are omitted or simplified.

Embodiment

[Overview]

FIG. 1 is a diagram for describing an overview of an earth amount measurement system according to an embodiment.

Earth amount measurement system 1000 according to the embodiment (see FIG. 4, for example) includes a plurality of cameras 100 that capture the inside of predetermined three-dimensional space A1 (hereinafter, capturing an image is also referred to as imaging, and three-dimensional space A1 is also simply referred to as space A1). To give a specific example, space A1 is a space above road 20 on which earth 21 has accumulated. To give another specific example, space A1 is a space above a river in which earth 21, driftwood, or the like has accumulated. Earth amount measurement system 1000 is an example of the object amount calculation apparatus according to the present disclosure.

The plurality of cameras 100 are disposed in different positions, and capture a common three-dimensional space (space A1, for example). Thus, imaging target regions of the plurality of cameras 100 in space A1 include regions that at least partially overlap. For example, the plurality of cameras 100 are disposed in different positions to surround part of space A1 that includes earth 21 on road 20. Also, the plurality of cameras 100 are oriented differently. The imaging target regions of the plurality of cameras 100 at least partially overlap. The imaging target regions at least partially overlap so as to allow generation (reconstruction) of a three-dimensional model (point group data, for example) of space A1 based on video data obtained by imaging.

Note that the imaging target regions may overlap among some of cameras 100, or may overlap among all cameras 100.

The plurality of cameras 100 each may be a moving camera that captures images at different points in time. When cameras 100 are moving cameras, the number of cameras 100 is not particularly limited, so long as there is at least one camera 100.

In the processing performed in the three-dimensional reconstruction (processing of generating a three-dimensional model of space A1), a plurality of videos (hereinafter, videos are also referred to as images) obtained from the plurality of cameras 100 in the above manner are used to calculate (generate) three-dimensional model 22 representing space A1. The processing performed in the three-dimensional reconstruction is to, for example, calculate three-dimensional model 22 by making associations among a plurality of images obtained by the plurality of cameras 100 and performing geometric calculation based on the association relationship obtained.

Here, a three-dimensional model is data representing a geometric shape of a predetermined three-dimensional space (space A1 in the present embodiment). A model that represents a three-dimensional shape is, for example, a point group including a plurality of three-dimensional points. The three-dimensional model may be represented by voxels, or may be represented by a mesh.

Note that these ways of representing a three-dimensional model are mere examples, and do not limit the ways of representing a three-dimensional model.

Data based on which a three-dimensional model is generated need not be an image, and is not particularly limited. For example, data based on which a three-dimensional model is generated may be data obtained from a measuring instrument such as a LiDAR.

A LiDAR is a sensor for measuring a distance to an object. By causing a LiDAR to scan (move and measure) a predetermined region, the position of an object located in the predetermined region can be calculated.

This type of measuring instrument such as the LiDAR generates a three-dimensional model by emitting electromagnetic waves and obtaining reflected waves that are the emitted electromagnetic waves which have been reflected by a measurement target. Specifically, the measuring instrument measures a time period from the emission of electromagnetic waves to return of the electromagnetic waves after being reflected by the measurement target, and calculates the distance between the measuring instrument and a point on the surface of the measurement target using the measured time period and the wavelength of the electromagnetic waves.

For example, the measuring instrument emits electromagnetic waves in predetermined radial directions from a reference point of the measuring instrument. For example, the measuring instrument emits electromagnetic waves at intervals of a first angle around the horizontal direction, and emits electromagnetic waves at intervals of a second angle around the vertical direction. Accordingly, the measuring instrument can calculate the three-dimensional coordinates of a plurality of points on the measurement target by calculating a distance between the measuring instrument and the measurement target in each direction around the measuring instrument.

The measuring instrument emits, for example, laser light as the electromagnetic waves. Alternatively, the measuring instrument emits, for example, millimeter waves as the electromagnetic waves to measure a distance between the measuring instrument and the measurement target.

FIG. 2 is a diagram for describing an overview of attribute extraction processing performed by earth amount measurement system 1000 according to the embodiment. Specifically, (a) in FIG. 2 illustrates an example of an image generated by capturing space A1. Illustrated in (b) in FIG. 2 is a three-dimensional model representing space A1. Illustrated in (c) in FIG. 2 is an enlarged view of pixels of the image in (a) in FIG. 2 which have an attribute "tree".

Earth amount measurement system 1000 extracts one or more attributes using a plurality of items of image data obtained by a plurality of cameras 100 capturing space A1 or a three-dimensional model reconstructing space A1.

Here, an attribute is information indicating a result of recognition of the meaning that a particular region in an image or a three-dimensional model has. The attribute is information indicating that an attribute of an object in a given region in an image is "tree", for example. Another example of the attribute is information indicating that an attribute of a given partial point group in a three-dimensional model represented by a point group is "tree". That is to say, "tree", "driftwood", "earth", "house", and so on are examples of the attribute. As described, the three-dimensional model is constituted with regions having respective attributes, for example. The region is not particularly limited, and may be a predetermined range of the three-dimensional model, or may be a three-dimensional point included in the three-dimensional model. The region may be a partial model which will be described later. In other words, the three-dimensional model may be constituted with partial models, which will be described later, having respective attributes.

The attribute extraction processing is implemented by semantic segmentation, for example. Semantic segmentation is processing of giving a meaningful label to a pixel or a smallest unit of the three-dimensional model, using information on a peripheral pixel or a peripheral smallest unit of the three-dimensional model.

To be specific, as illustrated in (c) in FIG. 2, semantic segmentation is, for example, processing of giving a label "tree" to each pixel that has captured a tree present in a predetermined three-dimensional space. Each pixel can be labeled by referring to information on peripheral pixels. The information on peripheral pixels may be an R (red) G (green) B (blue) value, may be a luminance value, may be a distribution of pixel values, or may be a gradient. With this, a partial model which is a set of point groups to which the attribute "tree" has been assigned can be determined as a partial model having the attribute "tree".

The extraction of the attribute is performed by, for example, pattern recognition based on predetermined data indicating "tree" etc. A user may operate user interface 400 (see FIG. 4), which will be described later, to make an association between the attribute and an image or an object included in the three-dimensional model.

Figure 3:
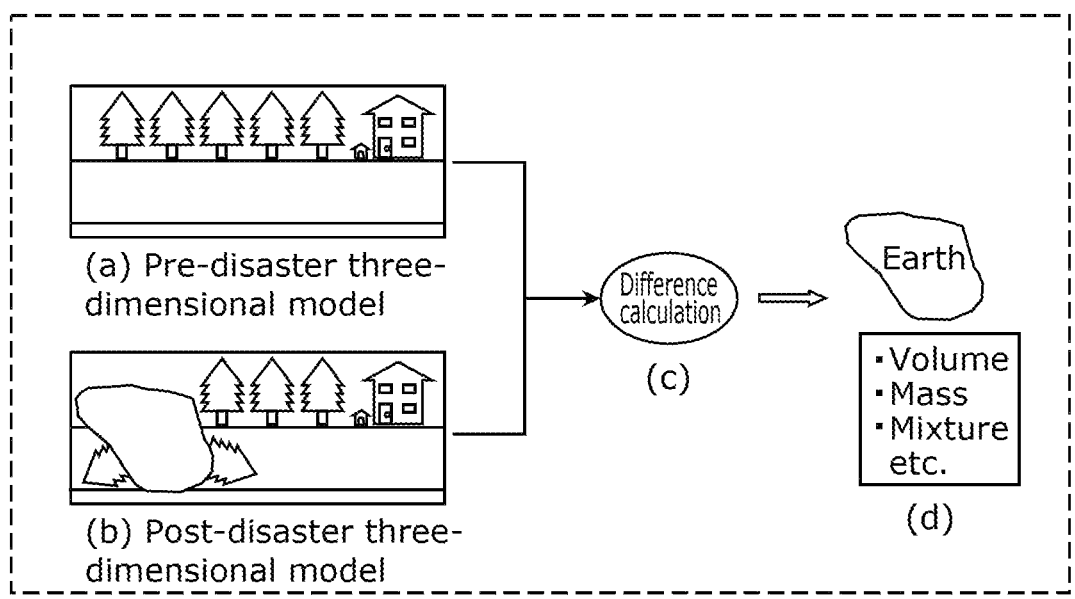
FIG. 3 is a diagram for describing an overview of earth amount calculation processing performed by the earth amount measurement system according to the embodiment.

FIG. 3 is a diagram for describing an overview of earth amount calculation processing performed by earth amount measurement system 1000 according to the embodiment. Specifically, (a) in FIG. 3 illustrates a three-dimensional model representing space A1 before a disaster. Illustrated in (b) in FIG. 3 is a three-dimensional model representing space A1 after the disaster. Illustrated in (c) in FIG. 3 is difference information calculation processing performed by earth amount measurement system 1000. Illustrated in (d) in FIG. 3 is an example of difference information that is output by earth amount measurement system 1000.

Earth amount measurement system 1000 extracts information on earth 21 (difference information) by calculating a difference using a pre-disaster three-dimensional model (hereinafter also referred to as a first three-dimensional model) and a post-disaster three-dimensional model (hereinafter also referred to as a second three-dimensional model), each of which has reconstructed space A1.

Earth amount measurement system 1000 extracts a part of the two three-dimensional models that shows a noticeable change before and after the disaster. The result of difference calculation is presented to the user as the difference information.

Here, the difference information is, for example, a volume of a three-dimensional partial region in which the pre-disaster three-dimensional model and the post-disaster three-dimensional model do not overlap or intersect in plane in a three-dimensional mesh model. The amount of difference calculated in such a manner is, for example, an amount of earth accumulated in a predetermined three-dimensional space after the disaster.

The difference information may include the attribute that is obtained by the attribute extraction and is the attribute of the part of the two three-dimensional models that shows a noticeable change before and after the disaster, e.g., information on a mixture including a plurality of attributes different from one another, such as proportions of driftwood, rubble, etc., included in earth 21.

The mixture is, for example, a set of partial models having different attributes. In the above example, the mixture is earth. Further, the mixture (i.e., earth) is a three-dimensional model including a partial model having an attribute indicating "driftwood" (a first partial model) and a partial model having an attribute indicating "rubble" (a second partial model). The difference information, for example, includes one or more attributes included in the information on the mixture, includes the volume of the mixture as the amount of the difference, and includes information indicating a proportion of the first partial model and a proportion of the second partial model in the volume of the mixture.

The mixture may be classified according to type of the attribute. Assume, for example, that the mixture includes a partial model having an attribute indicating "driftwood" (a first partial model), a partial model having an attribute indicating "rubble" (a second partial model), a partial model having an attribute indicating "traffic sign" (a third partial model), and a partial model having an attribute indicating "traffic light" (a fourth partial model). In this case, the mixture may be classified into a mixture including the first and the second partial models of natural objects (a first mixture) and a mixture including the third and the fourth partial models of man-made objects (a second mixture). In this case, the difference information may include information indicating a proportion of the first mixture and a proportion of the second mixture in the volume of the mixture.

As described above, the difference information includes, for example, differential information indicating an amount of difference between two three-dimensional models and the attribute of the difference. The amount of the difference is, for example, at least one of the volume or the weight of the difference.

Note that what is described above is a mere example of the difference information, and does not limit the difference information.

As for the scale of the three-dimensional models, one of the two three-dimensional models, that is, either the pre-disaster three-dimensional model or the post-disaster three-dimensional model, may be adjusted to a desired scale. For example, the scale of one of the pre-disaster three-dimensional model and the post-disaster three-dimensional model may be adjusted to the scale of space A1. Also, the scale of one of the pre-disaster three-dimensional model and the post-disaster three-dimensional model may be adjusted based on scale information provided from the outside of earth amount measurement system 1000. By the adjustment that allows the three-dimensional models to have the same scale, the difference can be calculated between the pre-disaster three-dimensional model and the post-disaster three-dimensional model having the same scale. This makes it possible to calculate the amount of earth with the scale of space A1.

Note that earth amount measurement system 1000 is an example of the object amount calculation apparatus according to the present disclosure. The above-described method of calculating the difference information may be used for calculating an amount of a target other than earth, such as an amount of stock in a warehouse, or may be used for calculating, for example, an amount of construction materials at the location of construction work.

[Configuration]

<Earth Amount Measurement System>

A configuration of earth amount measurement system 1000 is now described in detail.

Figure 4:
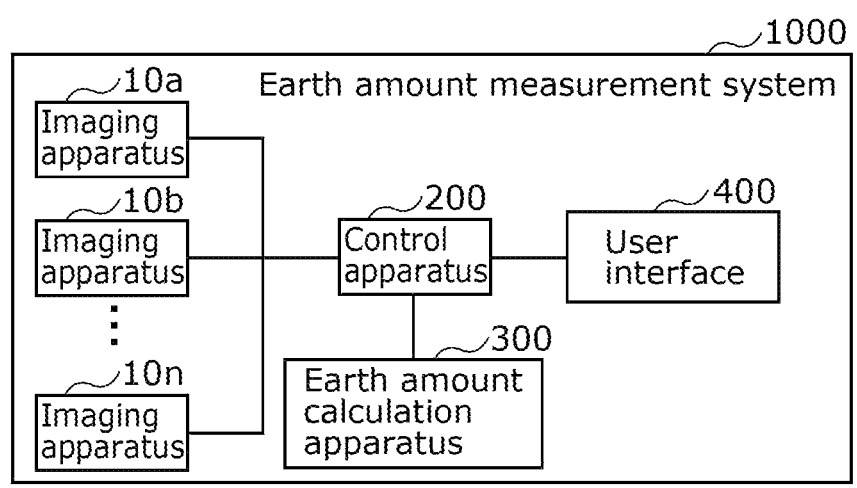
FIG. 4 is a block diagram illustrating a configuration of the earth amount measurement system according to the embodiment.

FIG. 4 is a block diagram illustrating a configuration of earth amount measurement system 1000 according to the embodiment.

Earth amount measurement system 1000 includes a plurality of imaging apparatuses 10a to 10n (for example, n imaging apparatuses from imaging apparatus 10a, imaging apparatus 10b, . . . to imaging apparatus 10n, where n is an integer of 2 or greater), control apparatus 200, earth amount calculation apparatus 300, and user interface 400. Imaging apparatuses 10a to 10n are communicatively connected with control apparatus 200. Earth amount calculation apparatus 300 and user interface 400 are also communicatively connected with control apparatus 200.

Note that imaging apparatuses 10a to 10n may be communicatively connected with control apparatus 200 in a wired manner or a wireless manner. Earth amount calculation apparatus 300 and user interface 400 may also be communicatively connected with control apparatus 200 in a wired manner or a wireless manner.

User interface 400 is a reception appliance for receiving a user operation. User interface 400 is implemented by, for example, a display apparatus, a touch screen, a track pad, a keyboard, a mouse, or other kinds of controllers, which are connected to control apparatus 200, or a combination thereof. User interface 400 is an example of a display apparatus for displaying the attribute and the differential information calculated by the object amount calculation apparatus according to the present disclosure.

<Imaging Apparatuses>

Figure 5:
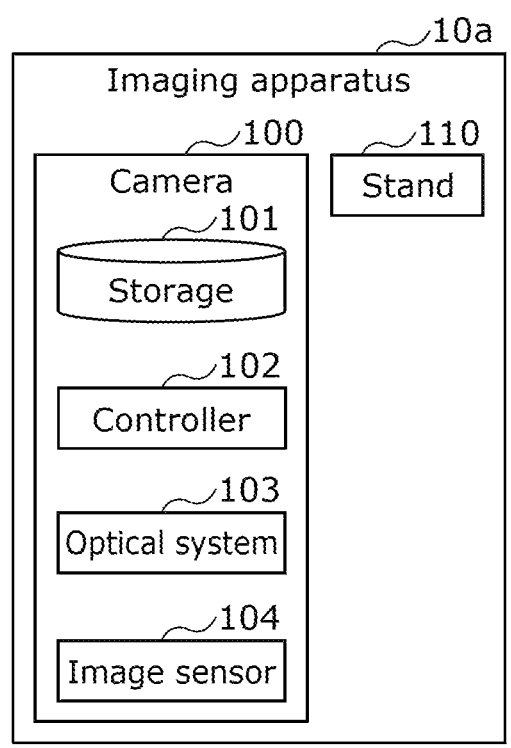
FIG. 5 is a block diagram illustrating a configuration of an imaging apparatus included in the earth amount measurement system according to the embodiment.

FIG. 5 is a block diagram illustrating a configuration of imaging apparatus 10a included in earth amount measurement system 1000 according to the embodiment. Note that, hereinafter, since imaging apparatuses 10a to 10n illustrated in FIG. 4 have the same configuration in the present embodiment, description focuses on imaging apparatus 10a when, of the plurality of imaging apparatuses 10a to 10n included in earth amount measurement system 1000, one imaging apparatus is to be described. Thus, the following description of imaging apparatus 10a also applies to other imaging apparatuses 10b to 10n.

Imaging apparatuses 10a to 10n are apparatuses each including a camera equivalent to camera 100 illustrated in FIG. 1, for capturing space A1. Possible configurations of imaging apparatuses 10a to 10n are the same, for example.

Here, space A1 is a union of imaging regions of the plurality of cameras 100.

Each of imaging apparatuses 10a to 10n includes camera 100, and may include stand 110.

Camera 100 includes storage 101, controller 102, optical system 103, and image sensor 104.

Storage 101 stores a program that is read and executed by controller 102. Storage 101 temporarily stores video data on an imaging region captured using image sensor 104, meta information such as a time stamp attached to the video data, a camera parameter of camera 100, and imaging settings such as a frame rate or a resolution that is being applied.

Such storage 101 is implemented by use of a rewritable, nonvolatile semiconductor memory such as a flash memory.

In addition, a read-only memory (ROM), which is non-rewritable, or a random access memory (RAM), which is volatile, can also be used as storage 101 according to whether data to be stored needs to be overwritten, how long the data has to be stored, or the like.

Note that the number of imaging apparatuses included in earth amount measurement system 1000 is not particularly limited. For example, the number of imaging apparatuses included in earth amount measurement system 1000 may be two or more. In addition, imaging apparatuses 10a to 10n included in earth amount measurement system 1000 need not have common properties. Also, cameras 100 included in imaging apparatuses 10a to 10n are not limited to monaural cameras and may be stereo cameras.

Furthermore, the number of imaging apparatuses included in earth amount measurement system 1000 may be one if it is possible to capture space A1 from a plurality of viewpoints by changing the position and the orientation of one imaging apparatus.

Controller 102 is implemented by use of a central processing unit (CPU), for example, and reads and executes the program stored in storage 101 to control each element included in camera 100 so as to allow the imaging function and other functions to be carried out.

Note that controller 102 may be implemented by a dedicated circuit that controls each element included in camera 100 to allow the imaging function and other functions to be carried out. In other words, controller 102 may be implemented by software or by hardware.

Optical system 103 is an element by which light from an imaging region is formed into an image on image sensor 104, and is implemented by use of optical elements including a lens. The focal distance and the angle of view of optical system 103 may be changeable. A wide-angle lens or a super-wide-angle lens such as a fisheye lens may be used in optical system 103. For example, when videos captured by cameras included in the object amount calculation apparatus according to the present disclosure are used in a monitoring system, wide-angle lenses may be used to expand an imaging region.

Image sensor 104 is implemented by a solid-state image sensor that receives light collected by optical system 103 with its light receiving surface and converts the received light into an electric signal representing an image, such as a charge-coupled-device (CCD) image sensor, a complementary metal-oxide-semiconductor (CMOS) image sensor, or a metal-oxide-semiconductor (MOS) image sensor.

Stand 110 is an element that fixes and supports camera 100 in a predetermined position while camera 100 generates a video to be used for earth amount calculation by imaging, and is implemented by, for example, a tripod.

Note that the length and the angle of the leg(s) of stand 110 may be adjustable in order to adjust a fixing position of camera 100 as preparation for the imaging.

Stand 110 may include a mechanism to rotate the pan head in order to pan or tilt camera 100, an elevating mechanism to move camera 100 vertically, and the like. Alternatively, stand 110 may include a mechanism to support and move camera 100, such as a dolly or a crane.

Note that imaging apparatuses 10a to 10n need not necessarily be fixed. Thus, imaging apparatuses 10a to 10n may have a configuration that does not include stand 110.

Note that the number of imaging apparatuses included in earth amount measurement system 1000 is not particularly limited, so long as earth amount measurement system 1000 includes a plurality of fixed cameras, one or more moving cameras, or a combination thereof. Also, the cameras are not limited to monaural cameras, and compound-eye cameras such as stereo cameras may be included.

<Control Apparatus>

Figure 6:
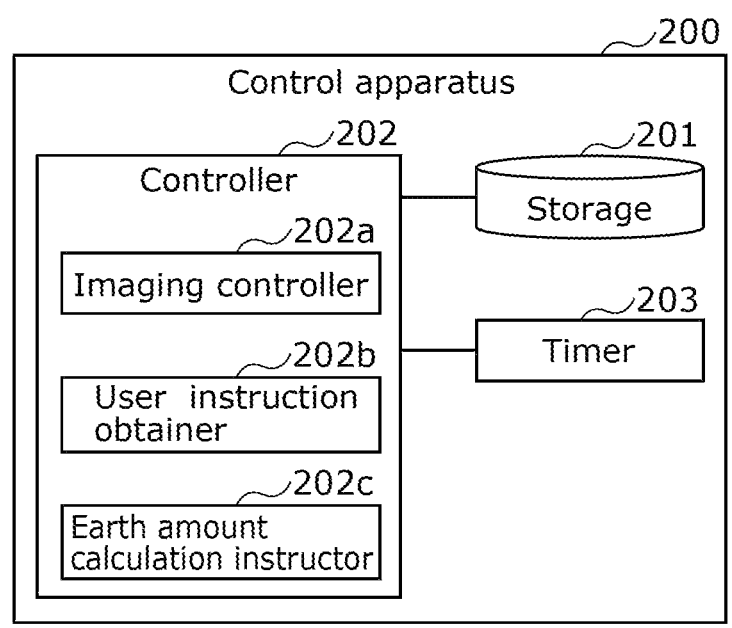
FIG. 6 is a block diagram illustrating a configuration of a control apparatus included in the earth amount measurement system according to the embodiment.

FIG. 6 is a block diagram illustrating a configuration of control apparatus 200 included in earth amount measurement system 1000 according to the embodiment.

Control apparatus 200 includes storage 201, controller 202, and timer 203.

Control apparatus 200 controls imaging apparatuses 10a to 10n, and receives and outputs data from and to user interface 400. Also, control apparatus 200 gives an earth amount calculation instruction to earth amount calculation apparatus 300 to perform earth amount calculation on data received from imaging apparatuses 10a to 10n.

An example of control apparatus 200 is a computer. In this case, storage 201 is a storage apparatus of the computer and is implemented by a hard disk drive, a semiconductor memory of any of various kinds, or a combination thereof. Controller 202 is implemented by a CPU of the computer.

Timer 203 is a timer included in control apparatus 200 and referred to by the CPU that implements controller 202.

Storage 201 stores a program that is read and executed by controller 202. Storage 201 stores data that is received from imaging apparatuses 10a to 10n and is to be processed by controller 202.

Controller 202 reads and executes the program stored in storage 201 so as to control above-described imaging apparatuses 10a to 10n and earth amount calculation apparatus 300.

Further, controller 202 performs processes in response to a user instruction related to the above control and processing. One of the processes is the control on capturing synchronized videos by cameras 100 included in imaging apparatuses 10a to 10n. Also, one of the processes may include the earth amount calculation instruction.

Controller 202 functionally includes imaging controller 202a, user instruction obtainer 202b, and earth amount calculation instructor 202c.

User instruction obtainer 202b included in controller 202 is a functional element that is implemented by controller 202 executing a program for obtaining a user instruction.

Further, earth amount calculation instructor 202c included in controller 202 is a functional element that is implemented by controller 202 executing a program for the earth amount calculation instruction.

Note that imaging controller 202a, user instruction obtainer 202b, and earth amount calculation instructor 202c of controller 202 may be implemented by dedicated circuits that allow, for instance, imaging control, user instruction obtainment, earth amount calculation instruction, and earth amount calculation processing to be carried out. In other words, controller 202 may be implemented by software or by hardware.

Imaging controller 202a causes imaging apparatuses 10a to 10n to capture space A1 that is the imaging region, at different times. Imaging controller 202a causes imaging apparatuses 10a to 10n to capture the imaging region in a state in which imaging apparatuses 10a to 10n are located in predetermined positions and oriented in predetermined directions.

User instruction obtainer 202b transmits, to user interface 400, imaging circumstance information provided from imaging apparatuses 10a to 10n, and obtains user input. The user input is a result of selection of data targeted for the earth amount calculation, information indicating whether the earth amount calculation processing is to be performed, or a combination thereof. When the user input is information indicating whether the earth amount calculation processing is to be performed, user instruction obtainer 202b outputs the information indicating whether the earth amount calculation processing is to be performed to, for example, earth amount calculation instructor 202c.

Earth amount calculation instructor 202c causes earth amount calculation apparatus 300 to perform the earth amount calculation processing based on, for example, the information indicating whether the earth amount calculation processing is to be performed, which has been received from user instruction obtainer 202b. Further, earth amount calculation instructor 202c may cause earth amount calculation apparatus 300 to perform the earth amount calculation processing based on the result of selection of data targeted for the earth amount calculation. A specific example of the processing performed by earth amount calculation instructor 202c will be described later.

<Earth Amount Calculation Apparatus>

Figure 7:
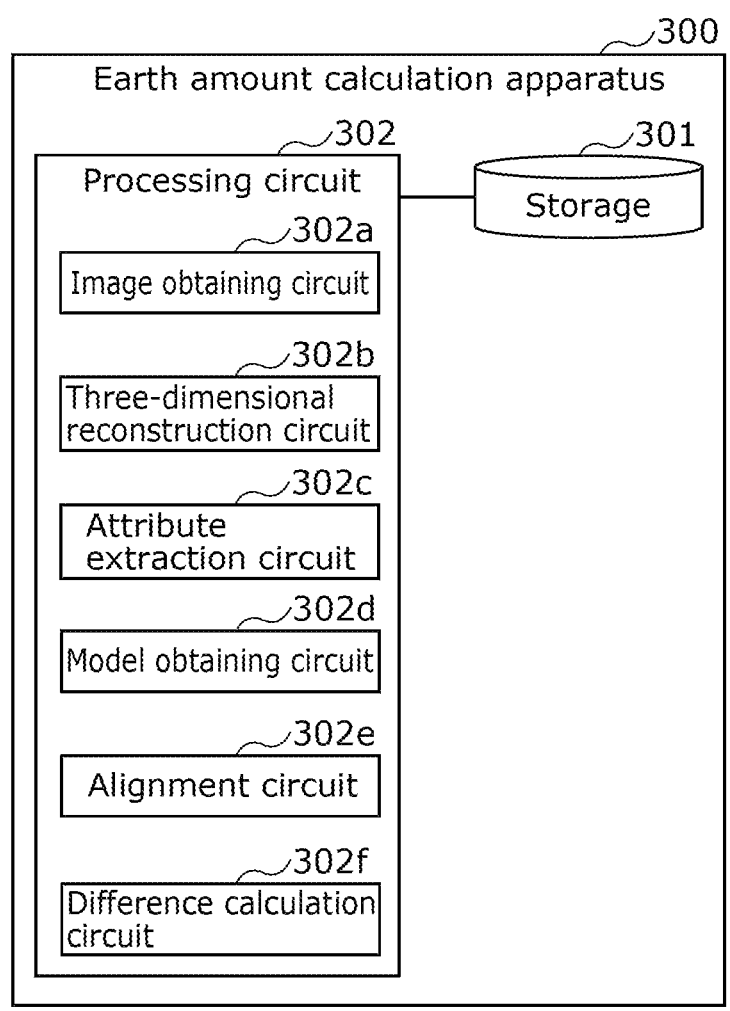
FIG. 7 is a block diagram illustrating a configuration of an earth amount calculation apparatus included in the earth amount measurement system according to the embodiment.

FIG. 7 is a block diagram illustrating a configuration of earth amount calculation apparatus 300 included in earth amount measurement system 1000 according to the embodiment.

Earth amount calculation apparatus 300 includes storage 301 and processing circuit 302.

Earth amount calculation apparatus 300 processes data received via control apparatus 200. Specifically, earth amount calculation apparatus 300 performs the earth amount calculation processing on earth 21 that is present in space A1 captured by cameras 100 included in imaging apparatuses 10a to 10n.

The target of the earth amount calculation processing by earth amount calculation apparatus 300 is, for example, space A1 after a disaster. With this, the amount of earth 21 (earth amount) accumulated in space A1 can be determined by calculating the difference from the three-dimensional model of space A1 before the disaster.

The target of the earth amount calculation processing by earth amount calculation apparatus 300 need not be space A1 immediately after a disaster, and may be, for example, space A1 during earth removal work. With this, earth amount calculation apparatus 300 can calculate the progress of the earth removal work by sequentially calculating the amount of earth.

The target of the earth amount calculation processing by earth amount calculation apparatus 300 is not particularly limited, and need not be space A1 before or after a disaster.

An example of earth amount calculation apparatus 300 is a computer. In this case, storage 301 is a storage apparatus of the computer and is implemented by a hard disk drive, a semiconductor memory of any of various kinds, or a combination thereof. Processing circuit 302 is implemented by a CPU of the computer. Note that earth amount calculation apparatus 300 may be implemented by the same computer as that of control apparatus 200.

Storage 301 stores a program that is read and executed by processing circuit 302. Storage 301 also stores data received from imaging apparatuses 10a to 10n via control apparatus 200 and data on a three-dimensional model that is obtained from an external apparatus and is to be processed by processing circuit 302. That is to say, storage 301 may store a three-dimensional reconstruction result, and may store an attribute extraction result. A pre-disaster three-dimensional model may be stored or a post-disaster three-dimensional model may be stored as the three-dimensional reconstruction result.

Processing circuit 302 reads and executes the program stored in storage 301 so as to process the data received from imaging apparatuses 10a to 10n. One of the processes is three-dimensional reconstruction of space A1.

Processing circuit 302 includes image obtaining circuit 302a, three-dimensional reconstruction circuit 302b, attribute extraction circuit 302c, model obtaining circuit 302d, alignment circuit 302e, and difference calculation circuit 302f.

Image obtaining circuit 302a obtains a plurality of images captured by imaging apparatuses 10a to 10n. Image obtaining circuit 302a further obtains, along with the images, camera labels corresponding to the images and indicating cameras 100 that have captured the images. For example, image obtaining circuit 302a may obtain a plurality of images and camera labels by obtaining images to which camera labels have been assigned. Each of the images may be a still image, or may be a moving image.

Note that a plurality of images used for calibration processing (three-dimensional reconstruction processing) may be images captured by the plurality of imaging apparatuses 10a to 10n at one corresponding time (i.e., at the same point in time). The plurality of images obtained by image obtaining circuit 302a are stored in storage 301. Image obtaining circuit 302a may store the images and the camera labels in storage 301 in advance, prior to receiving the earth amount calculation instruction from control apparatus 200. This allows earth amount calculation apparatus 300 to start the earth amount calculation processing when the earth amount calculation is determined to be necessary.

Three-dimensional reconstruction circuit 302b generates at least one of the first three-dimensional model or the second three-dimensional model from the plurality of images each representing space A1. More specifically, three-dimensional reconstruction circuit 302b calculates a three-dimensional shape of space A1, using the plurality of images obtained by imaging apparatuses 10a to 10n capturing space A1. For example, three-dimensional reconstruction circuit 302b generates a three-dimensional model of space A1 corresponding to a first point in time, using a group of images corresponding to the first point in time. Three-dimensional reconstruction circuit 302b also generates a three-dimensional model of space A1 using a group of images corresponding to a point in time different from the first point in time. In such a manner, three-dimensional reconstruction circuit 302b generates the first three-dimensional model and the second three-dimensional model that are of the same region but different in point in time.

Three-dimensional reconstruction circuit 302b, for example, calculates a three-dimensional shape of space A1 by making associations among the plurality of images captured by imaging apparatuses 10a to 10n and performing geometric calculation based on the association relationship. The model representing a three-dimensional shape may be represented by a point group, may be represented by voxels, or may be represented by a mesh.

Note that these ways of representing a three-dimensional model are mere examples. The ways of representing a three-dimensional model are not limited to those mentioned above.

Attribute extraction circuit 302c extracts an attribute for the plurality of images captured by imaging apparatuses 10a to 10n, the three-dimensional model(s) reconstructed by three-dimensional reconstruction circuit 302b, or a three-dimensional model obtained by model obtaining circuit 302d which will be described later. For example, attribute extraction circuit 302c estimates, for a three-dimensional point group, an attribute of each point based on information on peripheral points, and calculates the estimated attribute as the attribute. Also, for example, attribute extraction circuit 302c estimates, for image data, an attribute of an object captured in each image based on information on peripheral pixels, and associates the estimated attribute with each smallest unit of a three-dimensional model reconstructed.

Attribute extraction circuit 302c may obtain the three-dimensional model(s) reconstructed by three-dimensional reconstruction circuit 302b, may obtain, from storage 301, the plurality of images captured by imaging apparatuses 10a to 10n, may obtain a three-dimensional model obtained from storage 301, or may obtain a three-dimensional model from model obtaining circuit 302d which will be described later.

Model obtaining circuit 302d obtains a three-dimensional model from three-dimensional reconstruction circuit 302b and storage 301. For example, model obtaining circuit 302d obtains the model reconstructing space A1 before the disaster from storage 301, and obtains the model reconstructing space A1 after the disaster from three-dimensional reconstruction circuit 302b.

Note that model obtaining circuit 302d may obtain two or more three-dimensional models from storage 301. For example, model obtaining circuit 302d obtains the first three-dimensional model representing space A1 and the second three-dimensional model representing space A1 and different from the first three-dimensional model. Specifically, model obtaining circuit 302d obtains the first three-dimensional model that represents space A1 at a first point in time and the second three-dimensional model that represents space A1 at a second point in time different from the first point in time. In the present embodiment, model obtaining circuit 302d obtains two three-dimensional models before and after a disaster in space A1 from storage 301 (i.e., the first three-dimensional model representing space A1 before the disaster (at the first point in time) and the second three-dimensional model representing space A1 after the disaster (at the second point in time)). This make it possible to calculate the difference between the models without three-dimensional reconstruction circuit 302b performing the three-dimensional reconstruction processing.

The three-dimensional model obtained by model obtaining circuit 302d may be a model calculated using image data outside earth amount measurement system 1000, or may be a model calculated by laser measurement outside earth amount measurement system 1000.

Note that the three-dimensional models obtained may be represented by voxel data, may be represented by mesh data, or may be represented by point group data.

Using the two or more three-dimensional models obtained by model obtaining circuit 302d and the attribute calculated by attribute extraction circuit 302c, alignment circuit 302e performs processing of aligning the coordinate systems of the three-dimensional models, that is, processing of aligning the three-dimensional models. In other words, alignment circuit 302e aligns the first three-dimensional model and the second three-dimensional model based on an attribute of the first three-dimensional model and the second three-dimensional model. Specifically, alignment circuit 302e can efficiently compare the models by comparing, based on the attribute, parts which include three-dimensional models having the same attribute and correspond to partial regions forming part of space A1.

While changing combinations within partial models having the same attribute, alignment circuit 302e makes an association among the partial models.

Next, alignment circuit 302e compares the smallest units between partial models having one or more common attributes. For example, alignment circuit 302e compares three-dimensional points in the case where the three-dimensional models are represented by point groups.

Here, a partial model is a set of the smallest units representing part or all of regions of a three-dimensional model.

Alignment circuit 302e searches for closest points located closest to each other between the partial models and makes an association between the closest points, and adjusts the positions and the orientations of the coordinate systems to reduce the positional difference between each point. Alignment circuit 302e calculates a coordinate system that minimizes the difference by repeatedly performing calculation while changing the partial models associated and the points associated, and performs coordinate conversion on the three-dimensional model using the coordinate system calculated.

As described above, alignment circuit 302e performs alignment (coordinate conversion and size adjustment) based on an attribute. For example, alignment circuit 302e extracts, from a plurality of three-dimensional models, three-dimensional models (partial models) having the same attribute among the plurality of three-dimensional models. Alignment circuit 302e compares the extracted three-dimensional models to perform alignment. Further, alignment circuit 302e changes an entire three-dimensional model in accordance with a partial model changed by the alignment. That is to say, alignment circuit 302e extracts a partial model from the first three-dimensional model and a partial model from the second three-dimensional model which have a common attribute, aligns the partial models by shifting the partial models to align coordinates of corresponding positions in the partial models, and subsequently aligns the first three-dimensional model and the second three-dimensional model by shifting the first three-dimensional model and the second three-dimensional model in accordance with the shift of the partial models.

This way, alignment circuit 302e can more efficiently align the three-dimensional models than when collectively aligning the entire three-dimensional models.

The models resulting from the conversion may be stored in storage 301.

The partial models associated and the smallest units associated may be determined at random, or may be selected based on a feature amount. Further, the ways in which the partial models are associated and the smallest units are associated are not limited to those described above. Note that when aligning colored models, information on color difference may be used for the alignment.

As for the scale of the three-dimensional models, one of the two three-dimensional models, that is, either the pre-disaster three-dimensional model or the post-disaster three-dimensional model, may be adjusted to a desired scale. For example, it may be adjusted to the scale of space A1. The scale of the three-dimensional model may be adjusted based on scale information provided from the outside of earth amount measurement system 1000. By the adjustment of the scale of the three-dimensional model, the difference can be calculated between the pre-disaster three-dimensional model and the post-disaster three-dimensional model having the same scale. This makes it possible to calculate an amount of earth with the scale of space A1.

Difference calculation circuit 302f calculates an amount of difference between the first three-dimensional model and the second three-dimensional model, and outputs an attribute of the difference and differential information indicating the amount of difference. Specifically, difference calculation circuit 302f calculates difference information indicating a difference between two or more three-dimensional models whose coordinate systems have been aligned by alignment circuit 302e. For example, difference calculation circuit 302f calculates the volume of a plane-covered three-dimensional region in which mesh models having the same coordinate system do not overlap or intersect in plane.

The difference information calculated by difference calculation circuit 302f may include an attribute of a region that shows a noticeable difference, e.g., information on a mixture included in earth. Note that the above difference information is a mere example, and is not to limit the present disclosure.

Difference calculation circuit 302f outputs the calculated difference information to user interface 400, for example. This allows the user to check the difference information (i.e., the attribute and the amount of earth 21 that is the amount of the difference) by operating user interface 400.

Further, for example, when the difference has a plurality of attributes different from one another, difference calculation circuit 302f classifies the plurality of attributes according to type, and outputs the classified attributes to cause a display apparatus (for example, user interface 400) to collectively display the plurality attributes on a type-by-type basis. In this case, difference calculation circuit 302f calculates an amount included in the amount of the difference on a type-by-type basis, for example.

[Processing Procedure]
<Alignment Processing>

Figure 8:
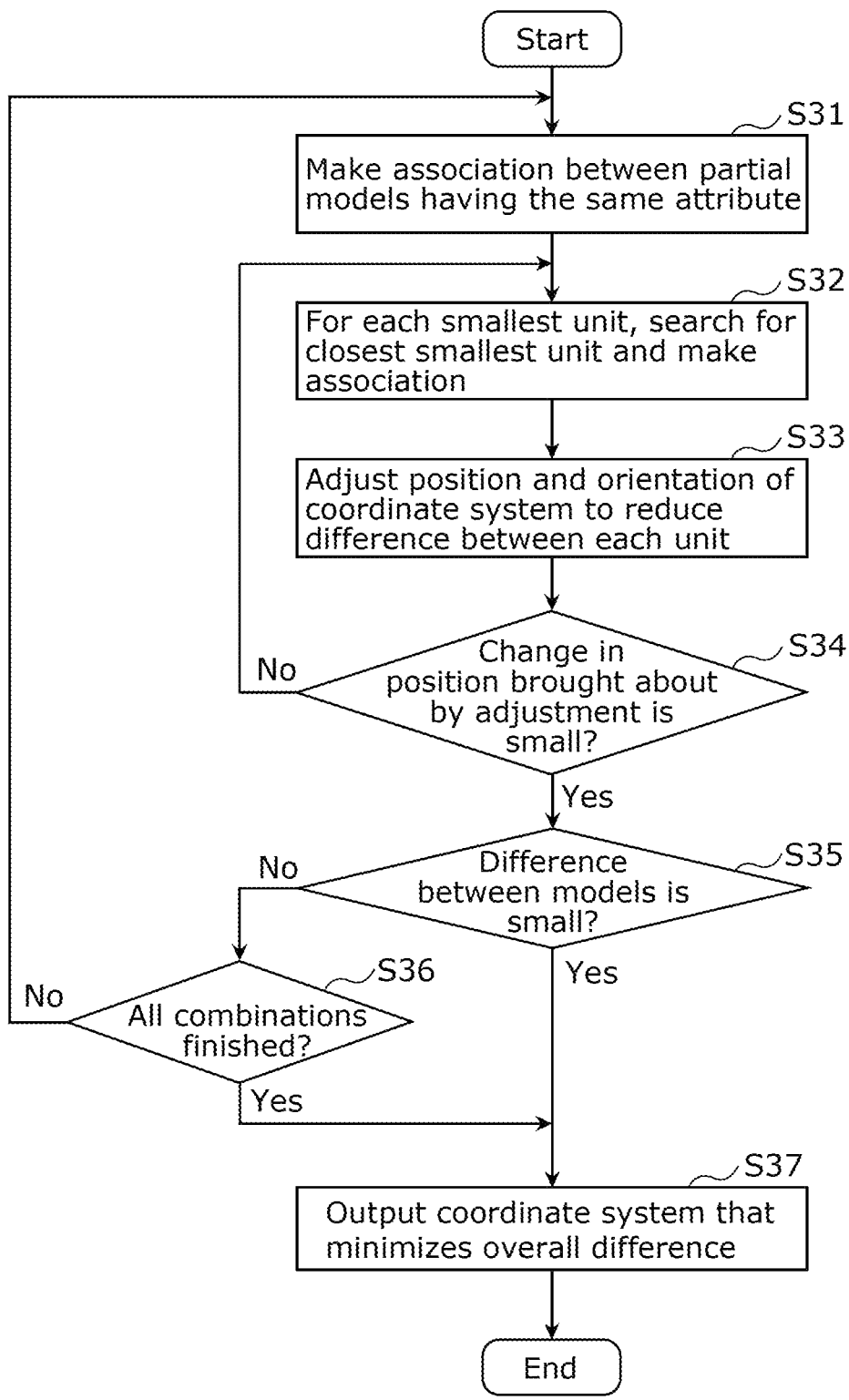
FIG. 8 is a flowchart illustrating three-dimensional model alignment processing performed by the earth amount measurement system according to the embodiment.
Figure 9:
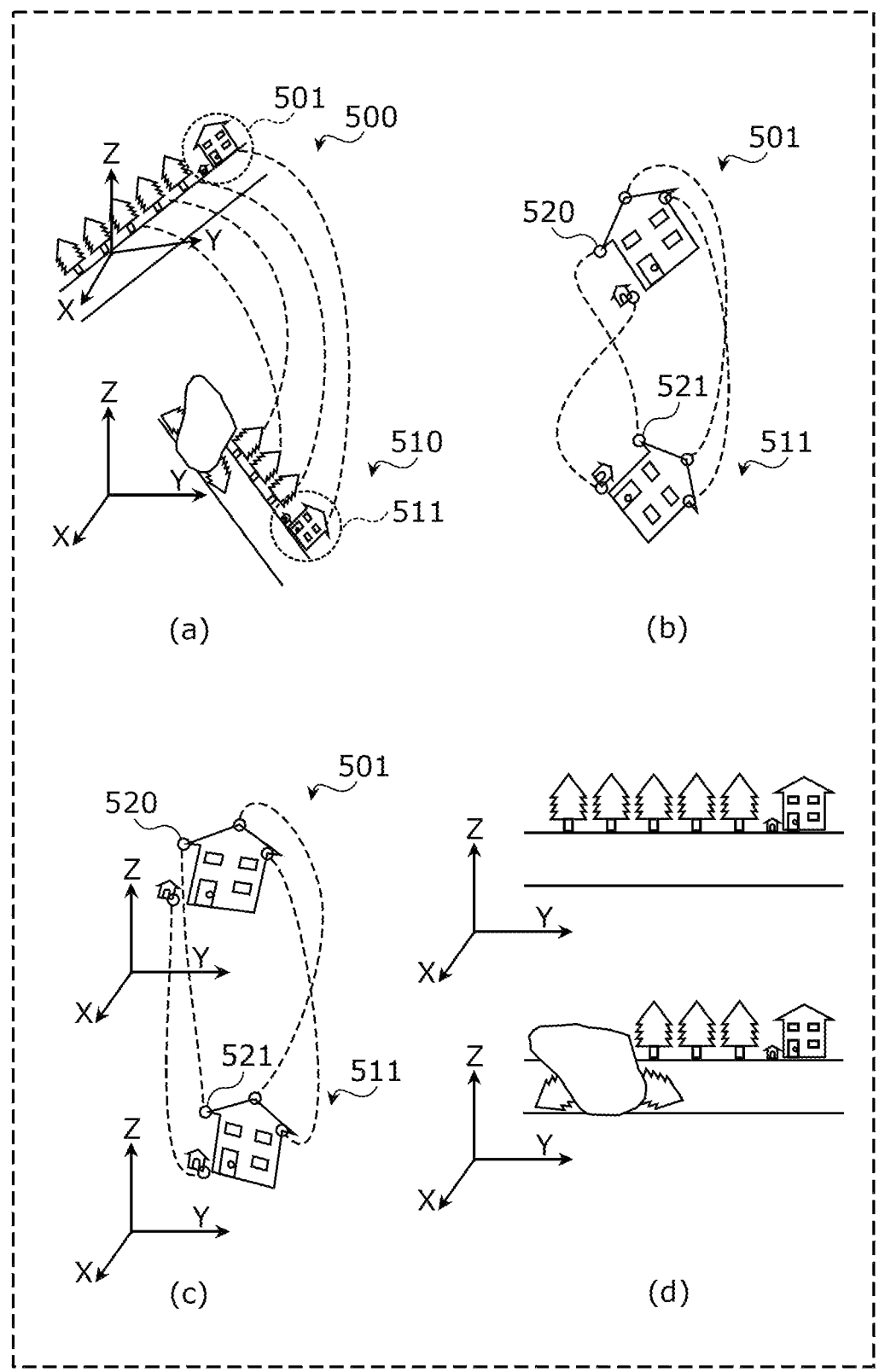
FIG. 9 is a diagram for describing alignment of two three-dimensional models performed by an alignment circuit.

FIG. 8 is a flowchart illustrating three-dimensional model alignment processing performed by earth amount measurement system 1000 according to the embodiment. FIG. 9 is a diagram for describing alignment of two three-dimensional models performed by alignment circuit 302e.

Alignment circuit 302e included in earth amount calculation apparatus 300 according to the present embodiment first makes an association between partial models that are included in two or more three-dimensional models and have the same attribute, e.g., between partial models labeled "house" (S31). That is to say, in this case, two three-dimensional models include partial models having an attribute that indicates "house", for example.

For example, as illustrated in (a) in FIG. 9, assume that a difference between first three-dimensional model 500 and second three-dimensional model 510 is to be calculated. In this case, alignment circuit 302e first extracts partial models having an attribute that is included in both first three-dimensional model 500 and second three-dimensional model 510. Here, assume that alignment circuit 302e has extracted first partial model 501 included in first three-dimensional model 500 and having an attribute "house" and second partial model 511 included in second three-dimensional model 510 and having an attribute "house". Next, as illustrated in (b) in FIG. 9, alignment circuit 302e makes an association between first partial model 501 and second partial model 511. Specifically, alignment circuit 302e extracts one or more feature points included in first partial model 501 and one or more feature points included in second partial model 511, and makes associations between the extracted feature points of first partial model 501 and the extracted feature points of second partial model 511. The feature points extracted here may be any feature points. For example, feature points are corners included in the partial models. Alignment circuit 302e makes an association between an extracted feature point of first partial model 501 and an extracted feature point of second partial model 511 which are the same. For example, alignment circuit 302e makes an association between extracted feature point 520 of first partial model 501 and extracted feature point 521 of second partial model 511.

Referring to FIG. 8 again, after step S31, alignment circuit 302e compares the smallest units between partial models having one or more common attributes, e.g., compares three-dimensional points in the case where the three-dimensional models are represented by point groups, and, for each point of the partial models, searches for a most closely located point and makes an association between the closest points (S32).

Next, alignment circuit 302e adjusts the position and orientation of the coordinate system of a partial model to reduce the positional difference between the points associated in step S32 (S33). For example, as illustrated in (c) in FIG. 9, alignment circuit 302e changes at least one of first partial model 501 or second partial model 511 to locate the associated feature points at the same coordinates. For example, alignment circuit 302e shifts at least one of first partial model 501 or second partial model 511 to locate associated feature points 520 and 521 at the same coordinates. Further, alignment circuit 302e changes the entire three-dimensional model in accordance with the change of the partial model. By doing so, alignment circuit 302e makes a change such that models in first three-dimensional model 500 and second three-dimensional model 510 that represent the same object are located in the same position with the same orientation.

Note that alignment circuit 302e may adjust the scale of a three-dimensional model when adjusting the position and the orientation. The scale may be adjusted to one of two three-dimensional models, or the scales of both of two three-dimensional models may be adjusted based on scale information obtained from the outside.

Referring to FIG. 8 again, after step S33, alignment circuit 302e determines whether the change in position and orientation of the partial model (for example, at least one of first partial model 501 or second partial model 511 illustrated in FIG. 9), which has been made in step S33, is small (S34). The processing proceeds to step S32 when the change brought about by the position and orientation adjustment is large, and proceeds to step S35 when the change is small.

An amount of change used here as the reference may be freely determined in advance. For example, alignment circuit 302e subsequently performs step S32 when the amount of change before and after the adjustment of the position and orientation of the partial model is greater than or equal to a reference amount of change that has been freely determined in advance. On the other hand, for example, alignment circuit 302e subsequently performs step S35 when the amount of change before and after the adjustment of the position and orientation of the partial model is less than the reference amount of change. An amount of change is, for example, an amount of shift of each point. In the case of rotating an entire partial model about a reference point, the amount of change may be the rotation angle of the rotation.

Next, alignment circuit 302e compares the entire three-dimensional models based on the result of the position and orientation adjustment, and determines whether the overall difference between the entire three-dimensional models is large (S35). The processing proceeds to step S36 when the overall difference is large, and proceeds to step S37 when the difference is small.

An overall difference used here as the reference may be freely determined in advance. For example, alignment circuit 302e subsequently performs step S36 when the difference before and after the adjustment of the position and orientation of the entire three-dimensional model is greater than or equal to a reference difference that has been freely determined in advance. On the other hand, for example, alignment circuit 302e subsequently performs step S37 when the difference before and after the adjustment of the position and orientation of the entire three-dimensional model is less than the reference difference. Here, the difference is, for example, an amount of three-dimensional points, in two three-dimensional models, whose coordinates do not match.

Next, alignment circuit 302e determines whether all possible combinations have been compared in steps S31 and S32 (S36). The processing proceeds to step S37 when the comparison has finished for all possible combinations, and proceeds to step S31 when the comparison has not finished. Here, for instance, when the processing proceeds to step S31, alignment circuit 302e extracts, for example, partial models which have not yet been compared between first three-dimensional model 500 and second three-dimensional model 510, and makes an association between the extracted partial models.

Note that the steps and the processing order of the steps illustrated in FIG. 8 are mere examples, and are not particularly limited. For example, the processing may proceed to step S36 after step S33. Further, steps S34 and S35 may be excluded.

Finally, alignment circuit 302e outputs a coordinate system that minimizes the overall difference and a three-dimensional model obtained by the coordinate conversion (S37).

<Sequence Diagram>

Figure 10:
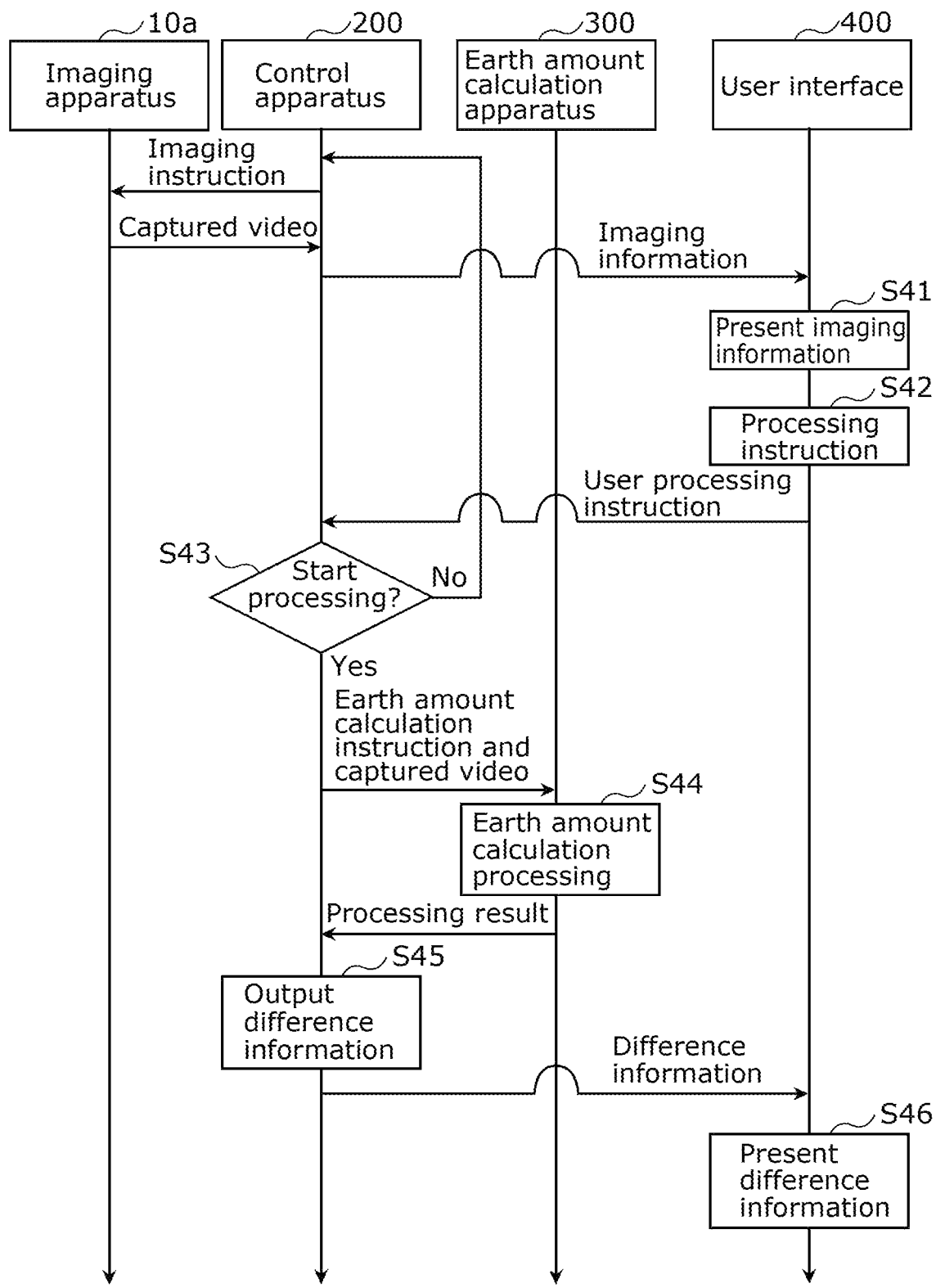
FIG. 10 is a sequence diagram illustrating processing of the earth amount measurement system according to the embodiment.

FIG. 10 is a sequence diagram illustrating processing of earth amount measurement system 1000 according to the embodiment.

Earth amount measurement system 1000 starts the earth amount calculation processing when a user processing instruction is received.

Control apparatus 200 transmits an imaging instruction to imaging apparatuses 10a to 10n (only imaging apparatus 10a is shown in FIG. 10), and transmits, to user interface 400, as imaging information, captured videos received from imaging apparatuses 10a to 10n, and user interface 400 presents the imaging information to the user (S41). The imaging information is, for example, an image of space A1.

The user operates user interface 400 to check the imaging information and determine, for example, whether imaging apparatuses 10a to 10n have appropriately captured a desired space and whether the imaging information is sufficient to start processing, and gives a processing instruction (S42). Specifically, the user operates user interface 400 to cause user interface 400 to transmit information indicating the processing instruction to control apparatus 200.

The user processing instruction transmitted via user interface 400 is information or a signal indicating whether to start the earth amount calculation processing or continue imaging by imaging apparatuses 10a to 10n. Note that the user processing instruction may include information identifying which imaging information is to be used for the earth amount calculation processing or information specifying a result to be output.

Next, based on the information indicating the user processing instruction received from user interface 400, control apparatus 200 determines whether to start the earth amount calculation processing or continue imaging by imaging apparatuses 10a to 10n (S43). When control apparatus 200 determines that the earth amount calculation processing is to be started (Yes in S43), control apparatus 200 transmits the earth amount calculation instruction and the captured videos to earth amount calculation apparatus 300.

On the other hand, when control apparatus 200 determines to continue imaging by imaging apparatuses 10a to 10n (No in S43), control apparatus 200 transmits, to imaging apparatuses 10a to 10n, information indicating an instruction to continue imaging, so as to cause imaging apparatuses 10a to 10n to continue imaging.

Next, when earth amount calculation apparatus 300 receives information indicating the earth amount calculation instruction from control apparatus 200, earth amount calculation apparatus 300 performs the earth amount calculation processing using the captured videos based on the information received (S44). Step S44 is the processing of, for example, steps S31 to S37 illustrated in FIG. 9. After completion of the earth amount calculation processing, earth amount calculation apparatus 300 transmits information indicating a processing result to control apparatus 200.

Next, based on the user processing instruction, control apparatus 200 organizes the processing result received from earth amount calculation apparatus 300, and outputs (transmits) the difference information to user interface 400 (S45).

User interface 400 presents the difference information received from control apparatus 200 to the user (S46). A specific example of the difference information presented to the user will be described later.

<Summary of Processing Procedure>

Figure 11:
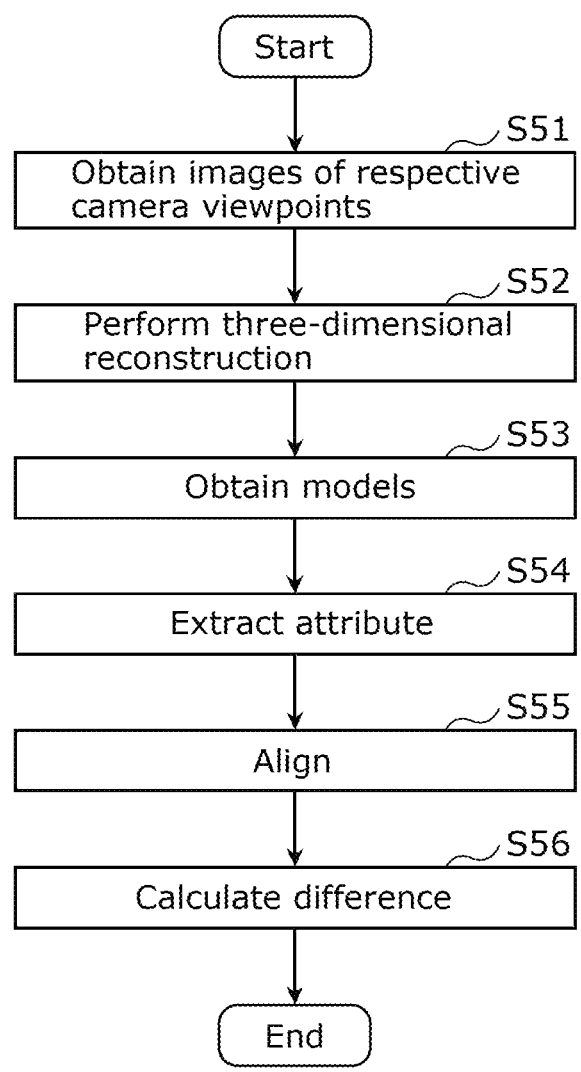
FIG. 11 is a flowchart illustrating the earth amount calculation processing performed by the earth amount measurement system according to the embodiment.

FIG. 11 is a flowchart illustrating the earth amount calculation processing performed by earth amount measurement system 1000 according to the embodiment.

In the earth amount calculation processing performed by earth amount calculation apparatus 300 according to the present embodiment, first, image obtaining circuit 302a obtains a plurality of images captured by imaging apparatuses 10a to 10n (S51).

Next, three-dimensional reconstruction circuit 302b performs the three-dimensional reconstruction processing using the plurality of images (S52). For example, three-dimensional reconstruction circuit 302b generates a first three-dimensional model representing space A1 and constituted with regions having respective attributes, and a second three-dimensional model representing space A1, constituted with regions having respective attributes, and different from the first three-dimensional model (for example, different in point in time).

Next, model obtaining circuit 302d obtains two or more three-dimensional models from three-dimensional reconstruction circuit 302b or storage 301 (S53). Note that model obtaining circuit 302d may obtain one or more three-dimensional models from three-dimensional reconstruction circuit 302b and one or more three-dimensional models from storage 301, or may obtain two or more three-dimensional models from storage 301.

Next, attribute extraction circuit 302c extracts one or more attributes from the plurality of images captured by imaging apparatuses 10a to 10n or from the three-dimensional models (S54). Note that step S54 may be performed before step S53, may be performed after step S53, or may be performed before and after step S53.

Next, alignment circuit 302e performs processing of aligning coordinates based on the two or more three-dimensional models and the attribute(s) (S55). Specifically, alignment circuit 302e aligns the first three-dimensional model and the second three-dimensional model based on an attribute of the first three-dimensional model and the second three-dimensional model. For example, based on an attribute of the first three-dimensional model and the second three-dimensional model, alignment circuit 302e detects corresponding points that are the same point in the first three-dimensional model and the second three-dimensional model, and aligns the first three-dimensional model and the second three-dimensional model using the detected corresponding points. Alignment circuit 302e can efficiently and accurately perform the alignment by making a comparison between regions having the same attribute in the three-dimensional models (i.e., between partial models having the same attribute).

Next, difference calculation circuit 302f calculates the difference information on a difference between the two or more models whose coordinate systems have been aligned by alignment circuit 302e (i.e., the two or more models aligned by alignment circuit 302e) (S56). The difference information includes, for example, differential information indicating an amount of difference and the attribute of the difference. Difference calculation circuit 302f, for example, outputs the calculated difference information to user interface 400 (more specifically, user interface 400 via control apparatus 200). User interface 400 presents (more specifically, displays) the obtained difference information to the user.

[Output Example]

Figure 12:
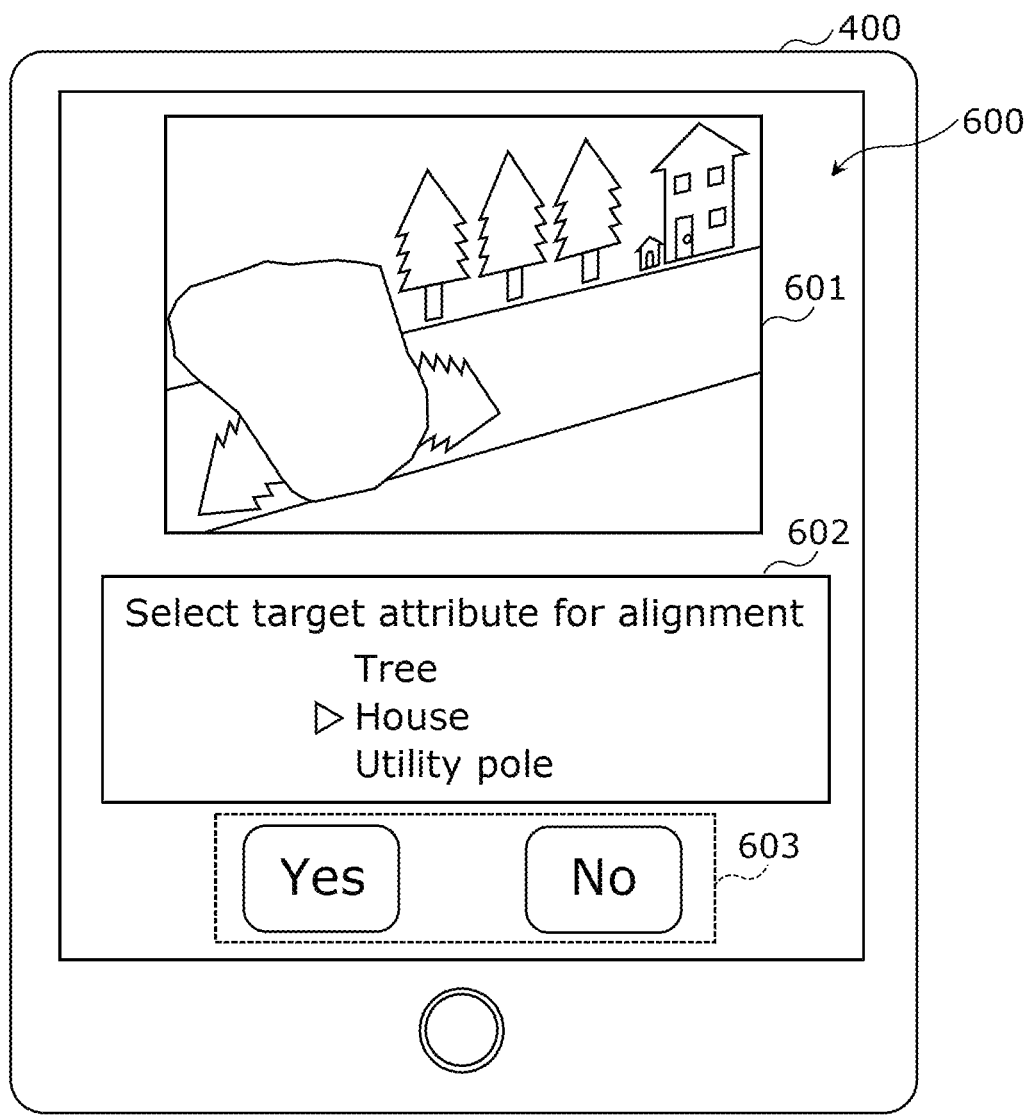
FIG. 12 is a diagram illustrating an example of an image presented by a user interface included in the earth amount measurement system according to the embodiment when two three-dimensional models are to be aligned.

FIG. 12 is a diagram illustrating an example of image 600 presented by user interface 400 included in earth amount measurement system 1000 according to the embodiment when two three-dimensional models are to be aligned.

User interface 400 is implemented by, for example, a mobile terminal such as a smartphone or a tablet terminal having a display apparatus and an input apparatus such as a touch panel display.

Note that the user may freely select the attribute to be used for the alignment, using a tablet-type mobile terminal as illustrated in FIG. 12.

For example, image 600 includes three-dimensional image 601, target selecting section 602, and determining section 603.

Three-dimensional image 601 is an image representing a post-disaster three-dimensional model.

Target selecting section 602 is an image for receiving a selection of a partial model having an attribute which is to be preferentially associated by alignment circuit 302e. For example, of three-dimensional image 601 or target selecting section 602, the user touches an attribute which the user wishes to be preferentially associated by alignment circuit 302e or a partial model having the attribute. User interface 400, for example, transmits information indicating the attribute or the partial model having the attribute touched by the user to control apparatus 200, for instance, after step S42 in FIG. 10, along with the information indicating the user processing instruction. Control apparatus 200, for example, transmits the information indicating the attribute or the partial model having the attribute touched by the user to earth amount calculation apparatus 300 along with the earth amount calculation instruction and the imaging information. Alignment circuit 302e, for example, in step S31, first selects a partial model based on the information indicating the attribute or the partial model having the attribute touched by the user, and makes association.

Figure 13:
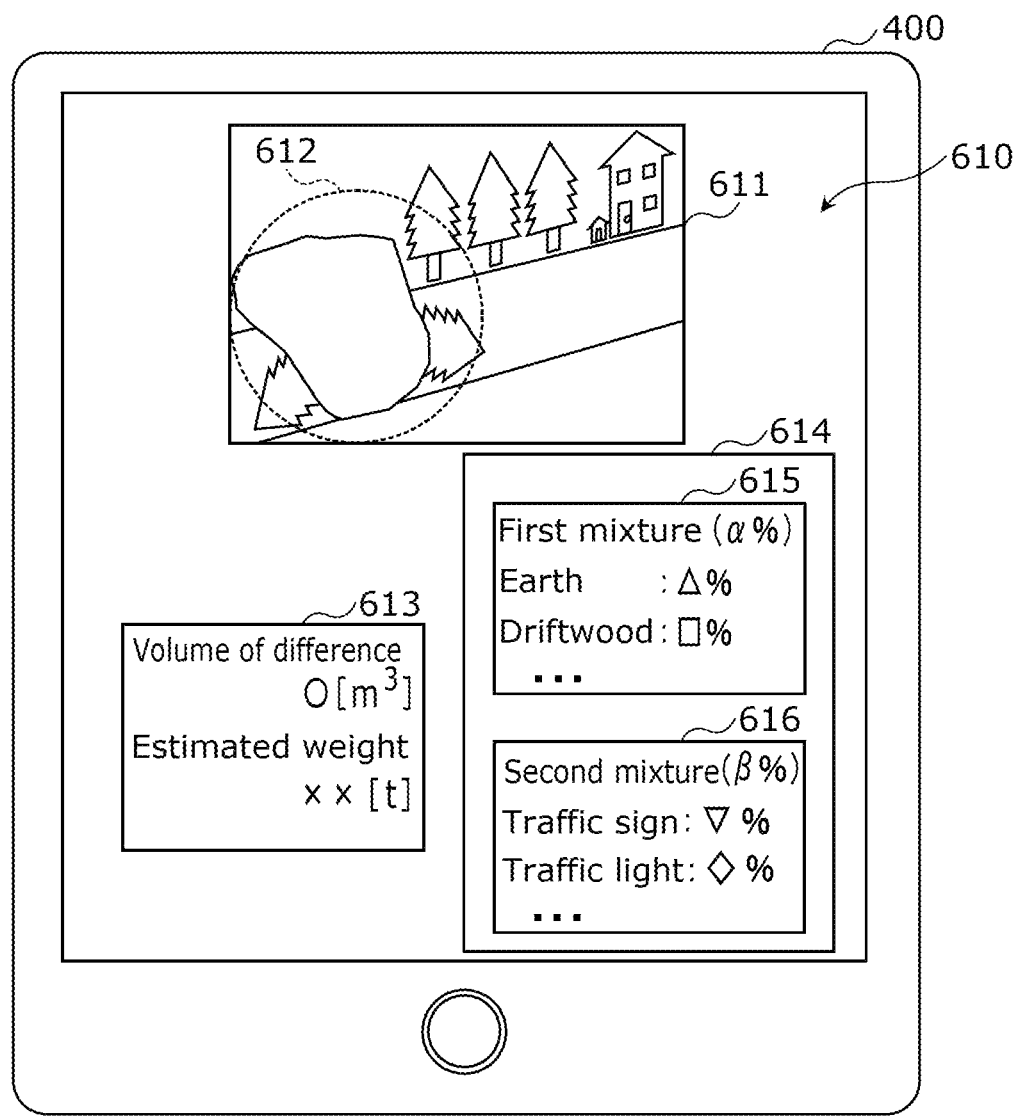
FIG. 13 is a diagram illustrating an example of difference information presented by the user interface included in the earth amount measurement system according to the embodiment.

FIG. 13 is a diagram illustrating an example of the difference information presented by user interface 400 included in earth amount measurement system 1000 according to the embodiment.

User interface 400 displays, using a tablet-type mobile terminal as illustrated in FIG. 13, a result indicating an amount of earth which is an example of the calculated amount of difference. User interface 400 may display, as the calculation result, an estimated weight of the earth other than the volume of the earth.

Further, user interface 400 may display a mixture of part corresponding to earth, using the attribute obtained by attribute extraction circuit 302c. This makes it possible to efficiently obtain information necessary for removing the earth and the mixture. The method of displaying the mixture is not limited to characters; the mixture may be displayed by coloring the relevant part on the three-dimensional model or the image.

For example, user interface 400 presents the difference information to the user by displaying image 610. For example, image 610 includes three-dimensional image 611, emphasis line 612, difference amount information image 613, and attribute image 614.

Three-dimensional image 611 is an image representing a post-disaster three-dimensional model.

Emphasis line 612 is a line indicating, in three-dimensional image 611, a position, a region, etc. of the difference from a pre-disaster three-dimensional model. Although FIG. 13 illustrates emphasis line 612 with a circle drawn with a broken line for the purpose of description, emphasis line 612 may be any line such as a solid line, a broken line, a bold line, or a colored line of a color different from the color of the other part, and may have any shape such as a quadrilateral shape or a polygonal shape.

Difference amount information image 613 is an image for presenting the amount of difference to the user. Difference amount information image 613 includes, for example, information indicating the volume of the difference and the estimated weight of the earth.

Attribute image 614 is an image for presenting the attribute of the partial model included in the difference to the user. For example, attribute image 614 includes, as the attribute of the partial model included in the difference, information indicating "earth", "driftwood", "traffic sign", "traffic light", etc. Further, in the present example, attribute image 614 includes the percentage of the volume or the weight of the part indicated by the attribute in the entire difference. In such a manner, the amount of the difference may be displayed on an attribute-by-attribute basis.

In the present example, attribute image 614 includes first type image 615 and second type image 616.

First type image 615 is an image for collectively presenting attributes that satisfy a first condition among a plurality of attributes included in the difference.

Second type image 616 is an image for collectively presenting attributes that satisfy a second condition among the plurality of attributes included in the difference.

In such a manner, the user interface may collectively display, for each type of attribute, an attribute and an amount of the partial model having the attribute.

Note that in the present example, the first condition is a natural object, and the second condition is a man-made object. These conditions may be freely determined in advance, and are not particularly limited.

[Advantageous Effects, Etc.]

As described above, an object amount calculation apparatus (for example, earth amount measurement system 1000; more specifically, earth amount calculation apparatus 300) according to an aspect of the present disclosure includes: an obtaining circuit (for example, model obtaining circuit 302d) that obtains a first three-dimensional model and a second three-dimensional model different from the first three-dimensional model, each of the first three-dimensional model and the second three-dimensional model representing a same space which is a predetermined space (for example, space A1), each of the first three-dimensional model and the second three-dimensional model being constituted with regions (for example, partial models or three-dimensional points included in the three-dimensional models) having respective attributes; alignment circuit 302e that aligns the first three-dimensional model and the second three-dimensional model based on an attribute of the first three-dimensional model and the second three-dimensional model; and a calculation circuit (for example, difference calculation circuit 302f) that calculates an amount of a difference between the first three-dimensional model and the second three-dimensional model which are aligned by the alignment circuit, and outputs an attribute of the difference and the amount of the difference.

There is a conventional method of, for example, calculating an amount of earth that has flowed into a predetermined space as a result of a landslide or the like at a scene of a landslide disaster, for instance. Laser measurement can calculate the amount of earth at high accuracy, but the calculation by the laser measurement is time-consuming and costly. In view of this, an object amount calculation apparatus according to the present disclosure, for example, compares a three-dimensional model representing a predetermined space in which an object, such as earth, whose amount is to be calculated is absent (a first three-dimensional model) and a three-dimensional model representing the predetermined space in which the object is present (a second three-dimensional model). With this, the difference between the first three-dimensional model and the second three-dimensional model can be simply and easily calculated by appropriately aligning the first three-dimensional model and the second three-dimensional model. Accordingly, the object amount calculation method according to the present disclosure can reduce the processing time for calculating the amount of the object.

For example, the object amount calculation apparatus according to the present disclosure further includes: a generation circuit (for example, three-dimensional reconstruction circuit 302b) that generates at least one of the first three-dimensional model or the second three-dimensional model from a plurality of images each representing the predetermined space.

This makes it possible to calculate the amount of the difference using a simple configuration for generating an image, such as a camera.

For example, when the difference has a plurality of attributes different from one another, the calculation circuit classifies the plurality of attributes according to type, and outputs classified attributes to cause a display apparatus (for example, user interface 400) to collectively display the plurality of attributes on a type-by-type basis.

With this, the types of objects included in the difference are classified and displayed by the display apparatus, and thus the user who checks the display apparatus can easily understand the types of the objects included in the difference.

For example, the calculation circuit calculates an amount included in the amount of the difference on the type-by-type basis.

With this, the amounts of objects included in the difference are displayed by the display apparatus on a type-by-type basis, and thus the user who checks the display apparatus can easily understand the amounts included in the amount of the difference on a type-by-type basis.

For example, the amount of the difference is at least one of a volume or a weight of the difference.

With this, the object amount calculation apparatus according to the present disclosure can calculate at least one of the amount or the volume of the difference.

For example, the alignment circuit extracts a partial model from the first three-dimensional model and a partial model from the second three-dimensional model which have a common attribute, aligns the partial models by shifting the partial models to align coordinates of corresponding positions in the partial models, and subsequently aligns the first three-dimensional model and the second three-dimensional model by shifting the first three-dimensional model and the second three-dimensional model in accordance with a shift of the partial models.

With this, the object amount calculation apparatus according to the present disclosure can align the first three-dimensional model and the second three-dimensional model without time-consuming processing such as alignment of the three-dimensional models through comparison of the shapes thereof. This makes it possible to further reduce the processing time of the object amount calculation apparatus according to the present disclosure.

An object amount calculation method according to an aspect of the present disclosure includes: obtaining (for example, step S53) a first three-dimensional model and a second three-dimensional model different from the first three-dimensional model, each the first three-dimensional model and the second three-dimensional model being three-dimensional models representing a same space which is a predetermined space, each of the first three-dimensional model and the second three-dimensional model being constituted with regions having respective attributes, aligning (for example, step S55) the first three-dimensional model and the second three-dimensional model based on an attribute of the first three-dimensional model and the second three-dimensional model; and calculating (for example, step S56) an amount of a difference between the first three-dimensional model and the second three-dimensional model, and outputting an attribute of the difference and the amount of the difference.

With this, the difference between the first three-dimensional model and the second three-dimensional model can be simply and easily calculated by appropriately aligning the first three-dimensional model and the second three-dimensional model. Accordingly, the object amount calculation method according to the present disclosure can reduce the processing time for calculating an amount of an object.

For example, in the obtaining, the first three-dimensional model representing the predetermined space before inflow of earth and the second three-dimensional model representing the predetermined space after the inflow of the earth are obtained, and in the calculating, an amount of the earth is calculated as the amount of the difference.

With this, the amount of earth, i.e., the difference, can be simply and easily calculated by appropriately aligning the three-dimensional models representing the predetermined space before and after a disaster that has caused earth to flow into the predetermined space. Accordingly, the object amount calculation method according to the present disclosure can reduce the processing time for calculating the amount of the earth.

Other Embodiments

Although an object amount calculation apparatus and the like according to the present disclosure have been described based on the above embodiment, the present disclosure is not limited to the above embodiment.

For example, the above embodiment has described that the processing circuit included in the object amount calculation apparatus and the like is implemented by a CPU and a control program. For example, elements of the processing circuit may each be configured with one or more electric circuits. Each of one or more electric circuits may be a general-purpose circuit, or may be a dedicated circuit. One or more electric circuits may include, for example, a semiconductor device, an integrated circuit (IC), a large scale integration (LSI) circuit, or the like. The IC or the LSI circuit may be integrated into a single chip or may be integrated into a plurality of chips. Although the name used here is IC or LSI circuit, it may be also called a system LSI circuit, a very large scale integration (VLSI) circuit, or an ultra large scale integration (ULSI) circuit, depending on the degree of integration. Further, a field-programmable gate array (FPGA) which is programmed after an LSI circuit is fabricated may be used for the same purpose.

In addition, general or specific aspects of the present disclosure may be implemented by a system, an apparatus, a method, an integrated circuit, or a computer program. Alternatively, the general or specific aspects may be implemented by a computer-readable, non-transitory recording medium such as an optical disc, a hard disk drive (HDD), or a semiconductor memory in which the computer program is stored. The general or specific aspects may also be implemented by any combination of systems, apparatuses, methods, integrated circuits, computer programs, or recording media.

The division of the functional blocks in the block diagrams is a mere example. A plurality of functional blocks may be implemented as a single functional block, a single functional block may be divided into a plurality of functional blocks, and part of the functions may be transferred to another functional block. In addition, functions of a plurality of functional blocks having similar functions may be processed in parallel or by time-division by a single hardware or software product.

Furthermore, since the processing orders of the steps in the flowcharts are mere examples illustrated for specifically describing the present disclosure, other processing orders may be adopted. In addition, part of the steps may be performed simultaneously (in parallel) with another step.

The present disclosure also encompasses other forms achieved by making various modifications conceivable to those skilled in the art to the above embodiment, as well as forms implemented by freely combining the elements and functions of the embodiment without departing from the essence of the present disclosure.

INDUSTRIAL APPLICABILITY

The present disclosure is applicable to an object amount calculation apparatus that calculates a difference from three-dimensional models, and is applicable to, for example, an apparatus and the like that calculate an amount of an object.

The invention claimed is:

1. An object amount calculation apparatus, comprising:
a receiver configured to obtain a first three-dimensional model and a second three-dimensional model different from the first three-dimensional model, each of the first three-dimensional model and the second three-dimensional model representing a same space, the first three-dimensional model corresponding to a first point in time and the second three-dimensional model corresponding to a point in time different from the first point in time, each of the first three-dimensional model and the second three-dimensional model being constituted with regions having respective attributes, the object amount calculation apparatus further comprising:
a processor configured to:
extract at least one attribute of the first three-dimensional model and the second three-dimensional model;
align the first three-dimensional model and the second three-dimensional model based on the at least one attribute of the first three-dimensional model and the second three-dimensional model that has been extracted, wherein the at least one attribute is information indicating a result of recognition of an object type in a respective region in the first three-dimensional model and the second three-dimensional model;
calculate, for each of the attributes, a difference between the first three-dimensional model aligned and the second three-dimensional model aligned, wherein the difference includes an attribute of the first three-dimensional model and the second three-dimensional model that shows a change between the first three-dimensional model and the second three-dimensional model; and
output (i) a total amount of differences corresponding to two or more attributes among the attributes and (ii) information on the two or more attributes.

2. The object amount calculation apparatus according to claim 1,
wherein the two or more attributes indicate a mixture in the same space.

3. The object amount calculation apparatus according to claim 1,
wherein the two or more attributes indicate a natural object or a man-made object in the same space.

4. The object amount calculation apparatus according to claim 1,
wherein the processor is further configured to:
generate at least one of the first three-dimensional model or the second three-dimensional model from a plurality of images each representing the same space.

5. The object amount calculation apparatus according to claim 1,
wherein the processor is configured to calculate an amount of the difference on an attribute-by-attribute basis.

6. The object amount calculation apparatus according to claim 1,
wherein an amount of the difference is at least one of a volume or a weight of the difference.

7. The object amount calculation apparatus according to claim 1,
wherein the processor is configured to extract a partial model from the first three-dimensional model and a partial model from the second three-dimensional model which have a common attribute, align the partial models by shifting the partial models to align coordinates of corresponding positions in the partial models, and subsequently align the first three-dimensional model and the second three-dimensional model by shifting the first three-dimensional model and the second three-dimensional model in accordance with a shift of the partial models.

8. The object amount calculation apparatus according to claim 1,
wherein the processor is configured to align the first three-dimensional model and the second three-dimensional model in a partial region which is a part of the same space, based on a first partial attribute that the first three-dimensional model has for the partial region and a second partial attribute that the second three-dimensional model has for the partial region, the second partial attribute being same as the first partial attribute.

9. The object amount calculation apparatus according to claim 8,
wherein the processor is configured to shift at least one of the first three-dimensional model or the second three-dimensional model of the same space other than the partial region, in accordance with a shift of at least one of the first three-dimensional model or the second three-dimensional model resulting from alignment of the first three-dimensional model and the second three-dimensional model in the partial region.

10. The object amount calculation apparatus according to claim 1,
wherein, when each of the first three-dimensional model and the second three-dimensional model has at least two attributes, the processor is configured to align the first three-dimensional model and the second three-dimensional model based on a predetermined attribute that is included in the at least two attributes and is an attribute that each of the first three-dimensional model and the second three-dimensional model has.

11. The object amount calculation apparatus according to claim 10, further comprising:
a user interface that receives an operation to give higher priority to the predetermined attribute than to another attribute included in the at least two attributes.

12. An object amount calculation method, comprising:
obtaining a first three-dimensional model and a second three-dimensional model different from the first three-dimensional model, each of the first three-dimensional model and the second three-dimensional model representing a same space, the first three-dimensional model corresponding to a first point in time and the second three-dimensional model corresponding to a point in time different from the first point in time, each of the first three-dimensional model and the second three-dimensional model being constituted with regions having respective attributes, the object amount calculation method further comprising:
extracting at least one attribute of the first three-dimensional model and the second three-dimensional model;
aligning the first three-dimensional model and the second three-dimensional model based on the at least one attribute of the first three-dimensional model and the second three-dimensional model that has been extracted, wherein the at least one attribute is information indicating a result of recognition of an object type in a respective region in the first three-dimensional model and the second three-dimensional model;
calculating, for each of the attributes, a difference between the first three-dimensional model and the second three-dimensional model which are aligned in the aligning, wherein the difference includes an attribute of the first three-dimensional model and the second three-dimensional model that shows a change between the first three-dimensional model and the second three-dimensional model; and
outputting (i) a total amount of differences corresponding to two or more attributes among the attributes and (ii) information on the two or more attributes.

13. The object amount calculation method according to claim 12,
wherein, in the obtaining, the first three-dimensional model representing the same space before inflow of earth and the second three-dimensional model representing the same space after the inflow of the earth are obtained, and
in the calculating, an amount of the earth is calculated as the total amount of the differences.

14. A non-transitory computer-readable recording medium for use in a computer, the recording medium having a computer program recorded thereon for causing the computer to execute an object amount calculation method including:
obtaining a first three-dimensional model and a second three-dimensional model different from the first three-dimensional model, each of the first three-dimensional model and the second three-dimensional model representing a same space, the first three-dimensional model corresponding to a first point in time and the second three-dimensional model corresponding to a point in time different from the first point in time, each of the first three-dimensional model and the second three-dimensional model being constituted with regions having respective attributes, the object amount calculation method further including:
extracting at least one attribute of the first three-dimensional model and the second three-dimensional model;
aligning the first three-dimensional model and the second three-dimensional model based on the at least one attribute of the first three-dimensional model and the second three-dimensional model that has been extracted, wherein the at least one attribute is information indicating a result of recognition of an object type in a respective region in the first three-dimensional model and the second three-dimensional model;
calculating, for each of the attributes, a difference between the first three-dimensional model and the second three-dimensional model which are aligned in the aligning, wherein the difference includes an attribute of the first three-dimensional model and the second three-dimensional model that shows a change between the first three-dimensional model and the second three-dimensional model; and
outputting (i) a total amount of differences corresponding to two or more attributes among the attributes and (ii) information on the two or more attributes.

* * * * *